(12) United States Patent
Healey

(10) Patent No.: US 12,280,430 B2
(45) Date of Patent: Apr. 22, 2025

(54) DOCKING ARRANGEMENT FOR AN ADDITIVE MANUFACTURING PROCESS

(71) Applicant: LPW Technology Ltd, Widnes (GB)

(72) Inventor: Callum Healey, Widnes (GB)

(73) Assignee: LPW Technology Ltd, Widnes (GB)

( * ) Notice: Subject to any disclaimer, the term of this patent is extended or adjusted under 35 U.S.C. 154(b) by 352 days.

(21) Appl. No.: 17/765,812

(22) PCT Filed: Sep. 29, 2020

(86) PCT No.: PCT/GB2020/052355
§ 371 (c)(1),
(2) Date: Mar. 31, 2022

(87) PCT Pub. No.: WO2021/064362
PCT Pub. Date: Apr. 8, 2021

(65) Prior Publication Data
US 2022/0371096 A1    Nov. 24, 2022

(30) Foreign Application Priority Data

Oct. 2, 2019  (GB) ..................................... 1914249

(51) Int. Cl.
| | |
|---|---|
| *B22F 12/52* | (2021.01) |
| *B22F 10/80* | (2021.01) |
| *B22F 12/90* | (2021.01) |
| *B33Y 30/00* | (2015.01) |
| *B33Y 50/00* | (2015.01) |

(52) U.S. Cl.
CPC .............. *B22F 12/52* (2021.01); *B22F 10/80* (2021.01); *B22F 12/90* (2021.01); *B33Y 30/00* (2014.12); *B33Y 50/00* (2014.12)

(58) Field of Classification Search
CPC ........... B22F 10/80; B22F 12/52; B22F 12/90
See application file for complete search history.

(56) References Cited

U.S. PATENT DOCUMENTS 6,190,461 B1 * 2/2001  Alack ................. B01F 35/2132
                                                          366/132
6,314,986 B1 * 11/2001 Zheng ...................... F17C 7/02
                                                          137/884

(Continued)

FOREIGN PATENT DOCUMENTS

| FR | 3058338 A1 | 5/2018 | |
|---|---|---|---|
| WO | WO-2018087087 A1 * | 5/2018 | ............... B07B 1/00 |
| WO | 2019/110900 A1 | 6/2019 | |

OTHER PUBLICATIONS

International Search Report and Written Opinion for PCT/GB2020/052355 dated Nov. 26, 2020; 12 pages.

*Primary Examiner* — Timothy L Maust
(74) *Attorney, Agent, or Firm* — Schwabe, Williamson & Wyatt, P.C.

(57) ABSTRACT

A docking arrangement (10) for coupling an outlet (16) of a container (12) to an inlet (18) for a component of an additive manufacturing process. The docking arrangement (10) includes a dock (11) configured to receive the container (12) and a gas supply (35) associated with the dock (11). A gas coupler (38*a*, 38*b*) is provided and is configured, in use, to couple the gas supply (35) with a gas inlet (32) associated with the container (12) when the container (12) is received within the dock (11).

13 Claims, 15 Drawing Sheets

(56) References Cited

U.S. PATENT DOCUMENTS

| | | | |
|---|---|---|---|
| 7,296,599 B2* | 11/2007 | Cox | B65G 53/22 |
| | | | 141/67 |
| 11,352,200 B2* | 6/2022 | Carroll | B33Y 30/00 |
| 2006/0219315 A1† | 10/2006 | Cox | |
| 2008/0050286 A1* | 2/2008 | Elliott | B01J 8/003 |
| | | | 422/232 |
| 2015/0114996 A1* | 4/2015 | Gallagher | B65D 88/26 |
| | | | 141/59 |
| 2017/0297813 A1 | 10/2017 | Carroll | |
| 2018/0200962 A1* | 7/2018 | Redding | B29C 64/40 |

\* cited by examiner
† cited by third party

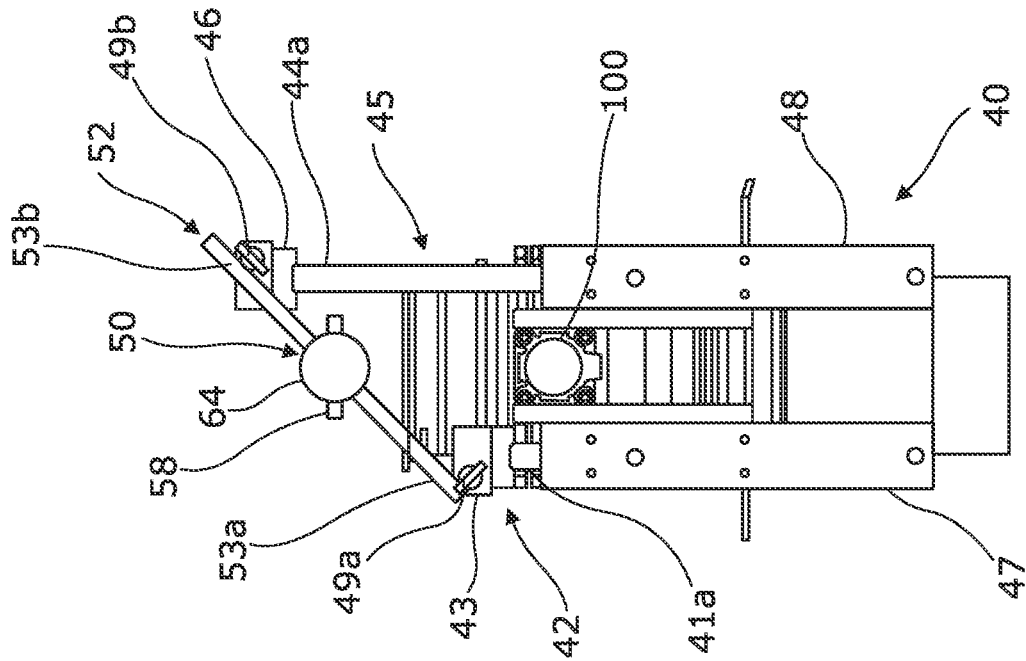
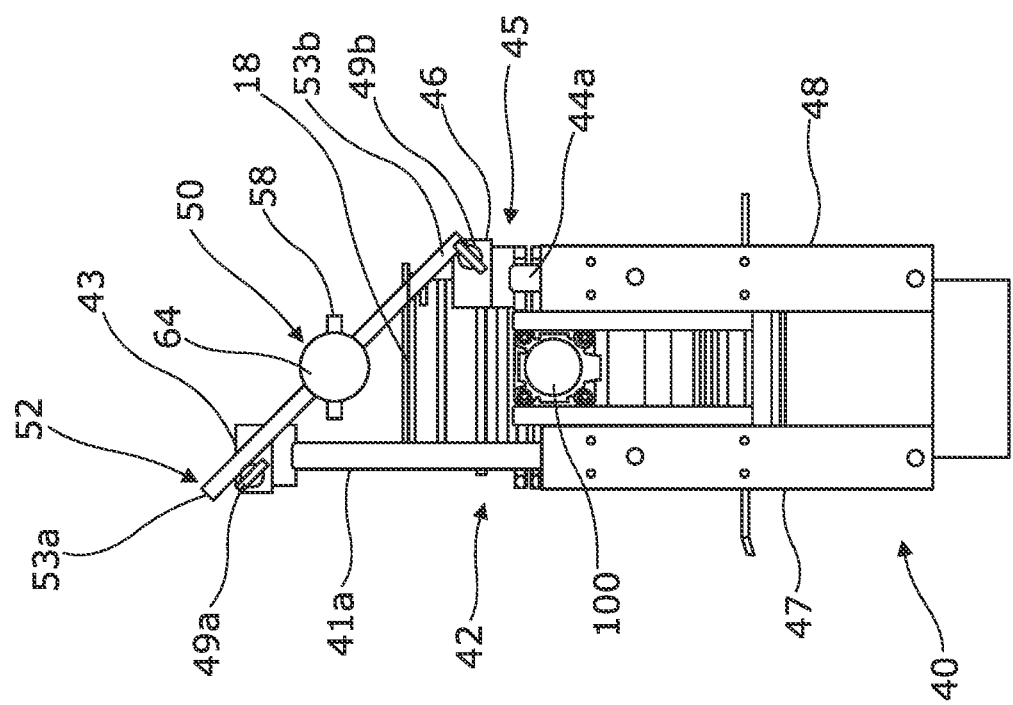
Fig. 7A
Fig. 7B

DOCKING ARRANGEMENT FOR AN ADDITIVE MANUFACTURING PROCESS

CROSS-REFERENCE TO RELATED APPLICATION

The present application is a national phase entry under 35 U.S.C. § 371 of International Application No. PCT/GB2020/052355, filed Sep. 29, 2020 which designates the United States of America, which claims priority to GB Application No. 1914249.6, filed Oct. 2, 2019, the entire disclosures of each of these applications are hereby incorporated by reference in their entireties and for all purposes.

TECHNICAL FIELD OF THE INVENTION

The present invention relates to a docking arrangement, and specifically to a docking arrangement for use in an additive manufacturing process for supplying material such as powders held within containers (e.g. hoppers) to additive manufacturing machines.

BACKGROUND TO THE INVENTION

Additive manufacturing generally relates to the process of manufacturing 3D objects by building up layers of a material or materials. Conventionally, the materials may be supplied to additive manufacturing machines in the form of powders (e.g. metal powders). For small scale manufacturing processes the powders may be supplied in containers (e.g. plastic jars). For larger scale processes, hoppers have been designed for transporting large amounts of powder and delivery to additive manufacturing machines. Such hoppers have been refined to ensure environmental conditions within the hopper (e.g. atmosphere, moisture, etc.) are kept under control. For example, some powders may oxidise in air so must be kept under a controlled atmosphere. Further, it is desirable in most cases to prevent the powder getting wet and this may lead to issues in delivering that powder to the additive manufacturing machines—i.e. it may prevent flow of the powder out of the hopper. However, to date, no complete solution has been provided.

For example, there is a need for a docking arrangement where a hopper containing a material (e.g. a powder) for a manufacturing process may be docked and coupled to a component of an additive manufacturing process (e.g. an additive manufacturing machine) for delivering the powder from the hopper to the component.

There is a need to provide an arrangement whereby dispensing of the material from the hopper can be controlled, e.g. automatically and/or manually, as the situation requires. For example, in general, the dispensing of material from the hopper is gravity fed and with large scale processes this can lead to manual control being unsuitable—e.g. out of reach. It would therefore be advantageous to provide an arrangement where the dispensing of material from the hopper can be controlled without an operator having to physically interact with the hopper, e.g. to open an outlet of the hopper.

There is a need to provide an arrangement whereby the hopper may be suitably secured to the component. This may be necessary to ensure that the coupling between the hopper and the component is stable and/or ensuring that any necessary environmental controls are maintained—e.g. air/water tight seal provided at the coupling between the hopper and the component. It may also be necessary to ensure that the coupling between the hopper and the component remains secured in place during dispensing of the material.

It is therefore an aim of an embodiment or embodiments of the invention to overcome or at least partially mitigate one or more problems associated with the prior art.

SUMMARY OF THE INVENTION

According to an aspect of the invention there is provided a docking arrangement for coupling an outlet of a container to an inlet for a component of an additive manufacturing process, the docking arrangement comprising: a dock configured to receive the container; a gas supply associated with the dock; and a gas coupler configured, in use, to couple the gas supply with a gas inlet associated with the container when the container is received within the dock.

In embodiments, the gas supply provides a source of gas to the container for controlling a pressure level within the container, for example, to assist in the flow of material from the container to the component of the additive manufacturing process. In further embodiments the gas supply may provide a source of gas to the container for controlling the atmosphere within the container and/or at an interface between the container and the component, for example, to prevent deterioration (e.g. corrosion, oxidation or other deterioration) of the material held within the container. The gas supply may be used to purge the container of air or some other gas and replace it with a chosen, e.g. inert, gas before the container is connected to a component of the additive manufacturing process.

In embodiments, the docking arrangement may be configured such that the gas coupler is automatically coupled with the gas inlet associated with the container upon receiving the container within the dock. In other embodiments the docking arrangement comprises a gas supply line which is connectable, in use, to the gas inlet associated within the container after the container has been received within the dock. Such an arrangement may require the supply line to be manually coupled to the gas inlet on the container.

In embodiments, the docking arrangement may comprise one or more pressure sensors.

The one or more pressure sensors may comprise an internal pressure sensor configured, in use, to determine a pressure level within the container above a material, such as metal powder, in the container. The one or more pressure sensors may comprise an external pressure sensor configured, in use, to determine a pressure level external to the container, or in or downstream of an outlet of the container.

In some embodiments the docking arrangement may comprise a control system configured to control the supply of gas from the gas supply to the container. The control system may be configured to control the supply of gas from the gas supply to the container in dependence on data received from the one or more pressure sensors.

The gas inlet may be provided within an upper surface of the container. The container may additionally comprise a gas outlet. The gas outlet may be provided for releasing gas from within the container. The gas outlet may, in some embodiments, comprise a bleed valve arrangement configured to ensure the pressure level within the container remains at or below a maximum pressure level. The gas outlet may be provided within an upper surface of the container.

The gas supply may comprise air. In some embodiments the gas supply comprises a gas which is specific to the material held within the container. For example, in some embodiments it may be desirable for the gas to comprise an inert gas, such as argon or nitrogen. In such embodiments, the use of inert gases may suitably inhibit oxidation or other deterioration of the material within the container.

In embodiments, the container may comprise a hopper.

DETAILED DESCRIPTION OF THE INVENTION

In order that the invention may be more clearly understood one or more embodiments thereof will now be described, by way of example only, with reference to the accompanying drawings, of which:

FIG. 7A is a side view of the operating handle shown in FIG. 6 in one state;

FIG. 7B is a side view of the operating handle shown in FIG. 6 in another state;

Figure 14A:
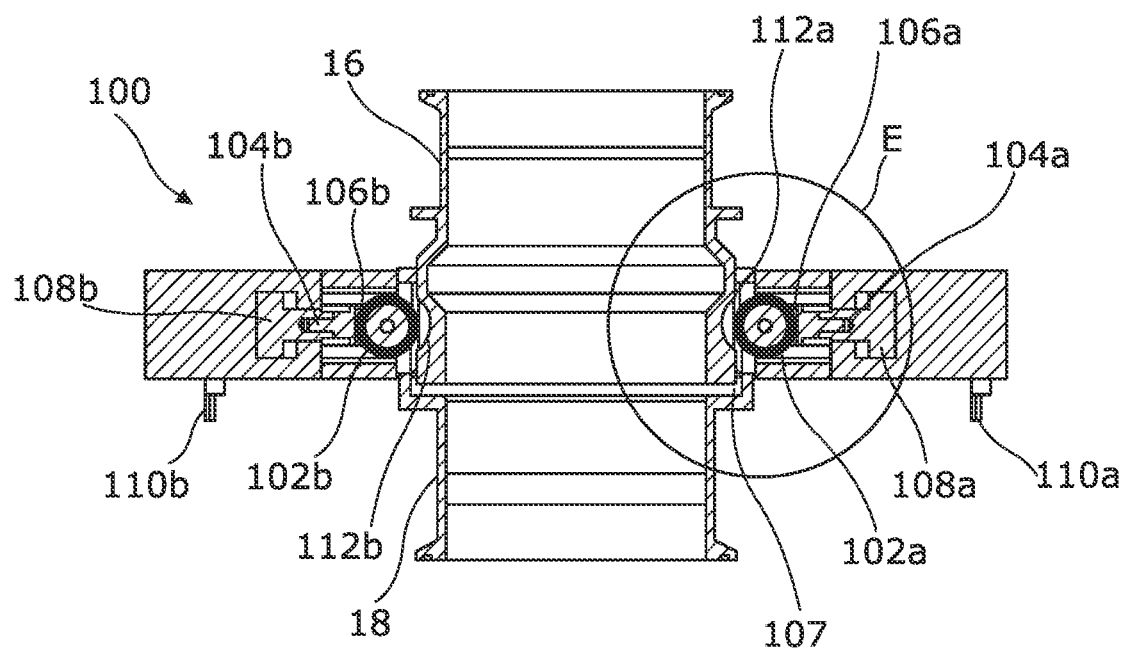
FIG. 14A is a cross-sectional view of the locking mechanism of FIGS. 12 and 13 in one state.
Figure 15A:
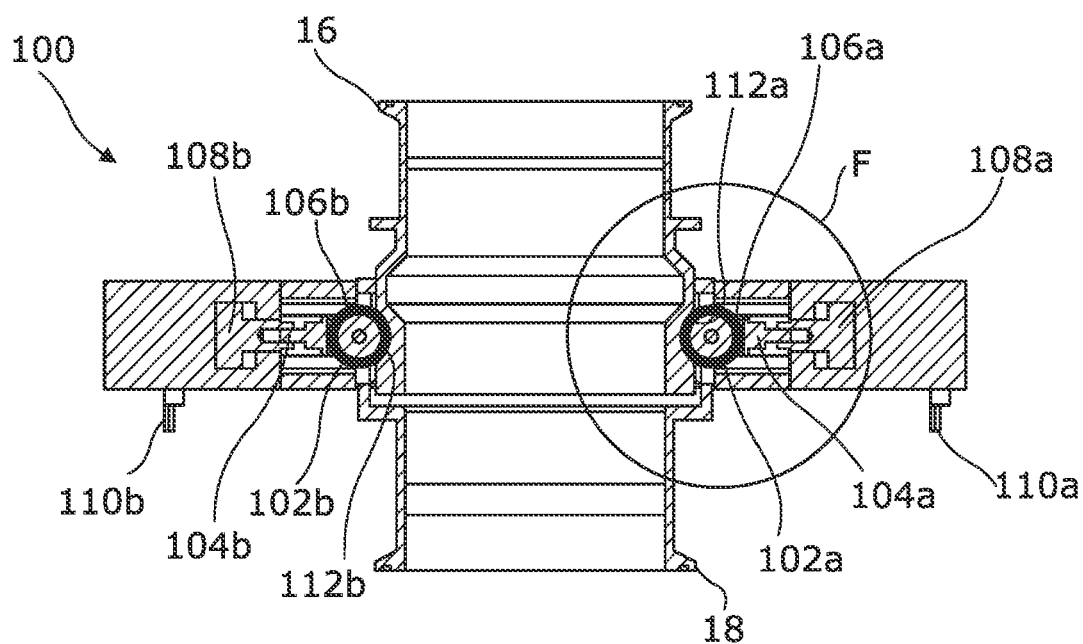
Figure 15B:
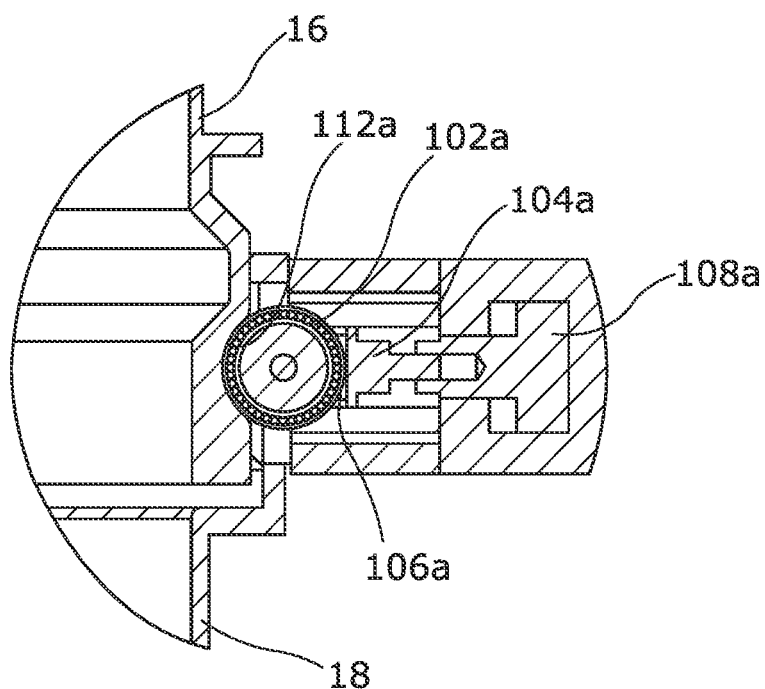
Figure 16:
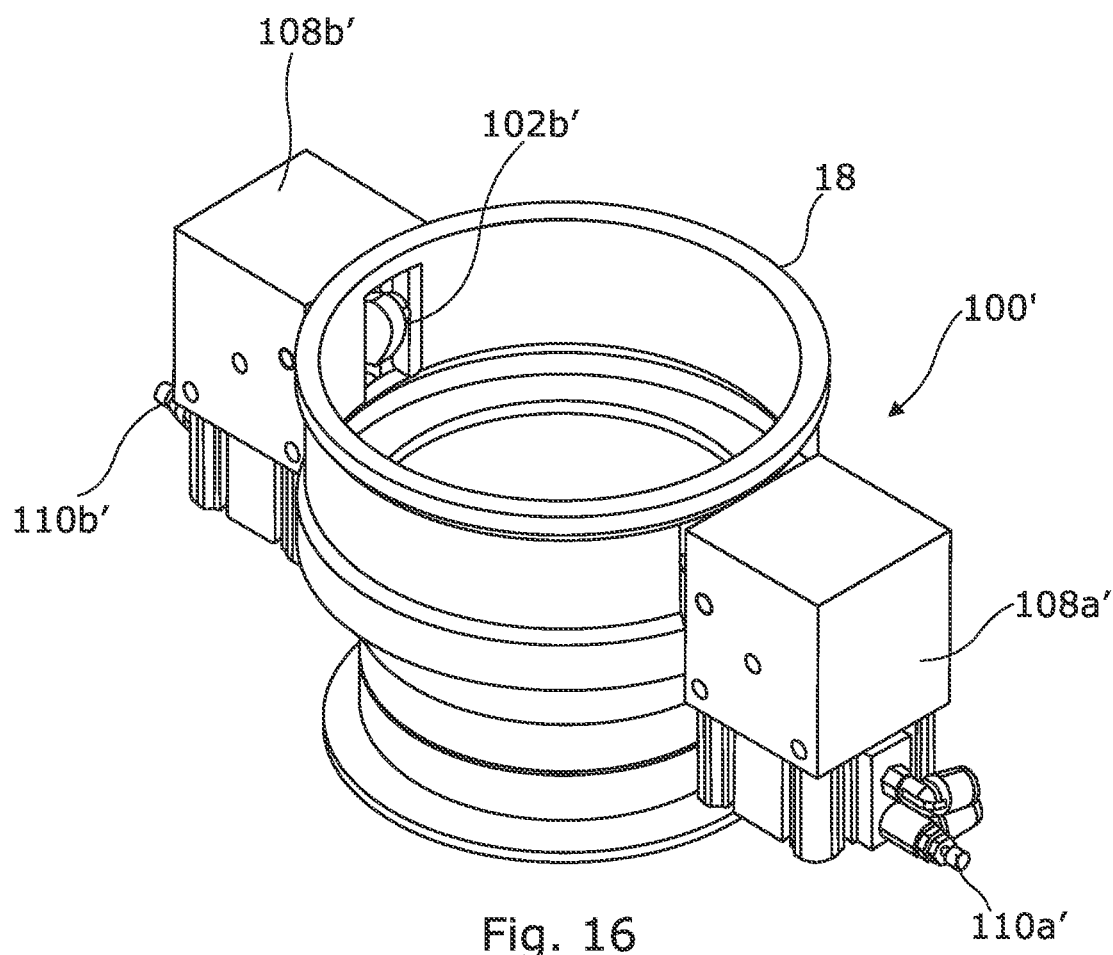
Figure 17:
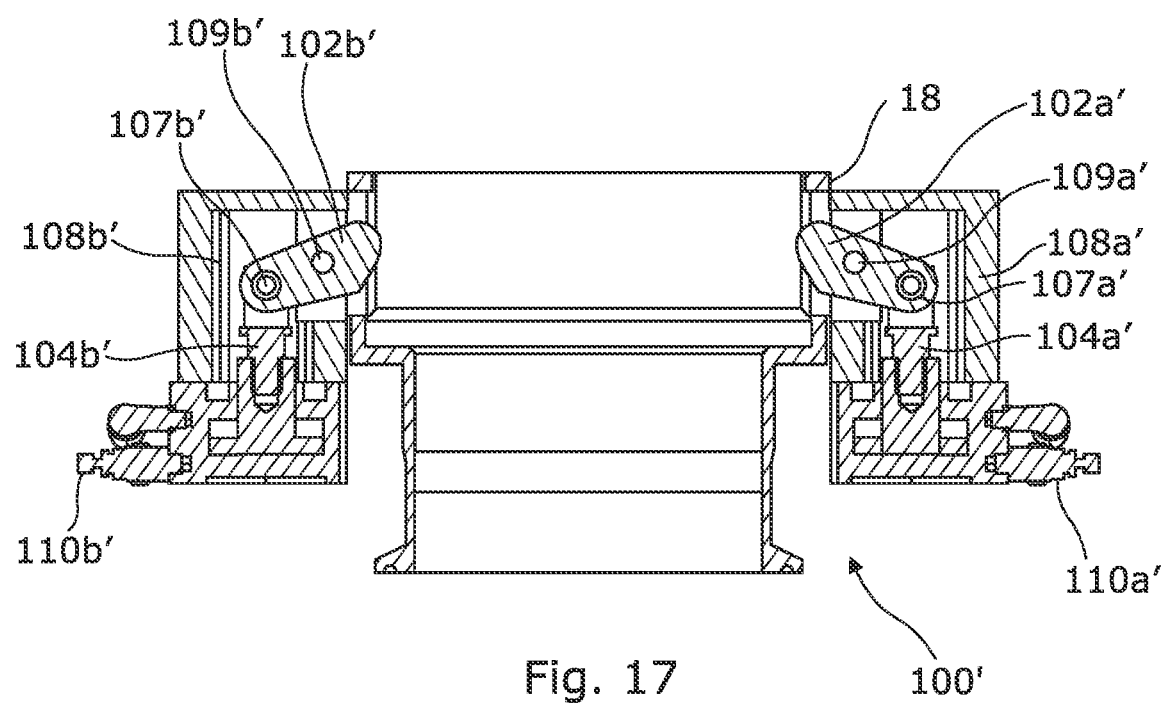
Figure 18A:
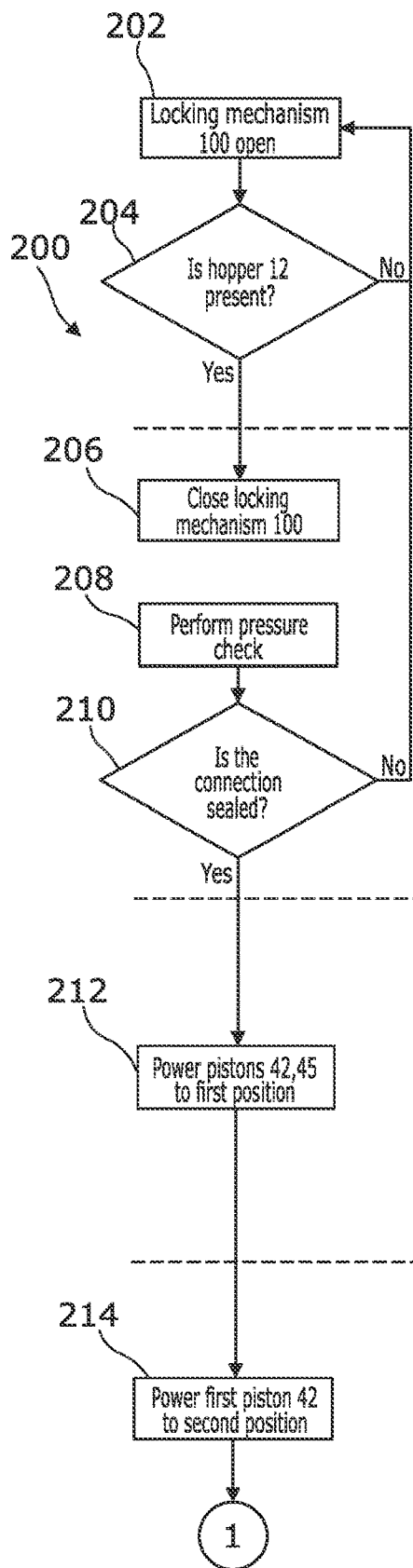
Figure 18A:
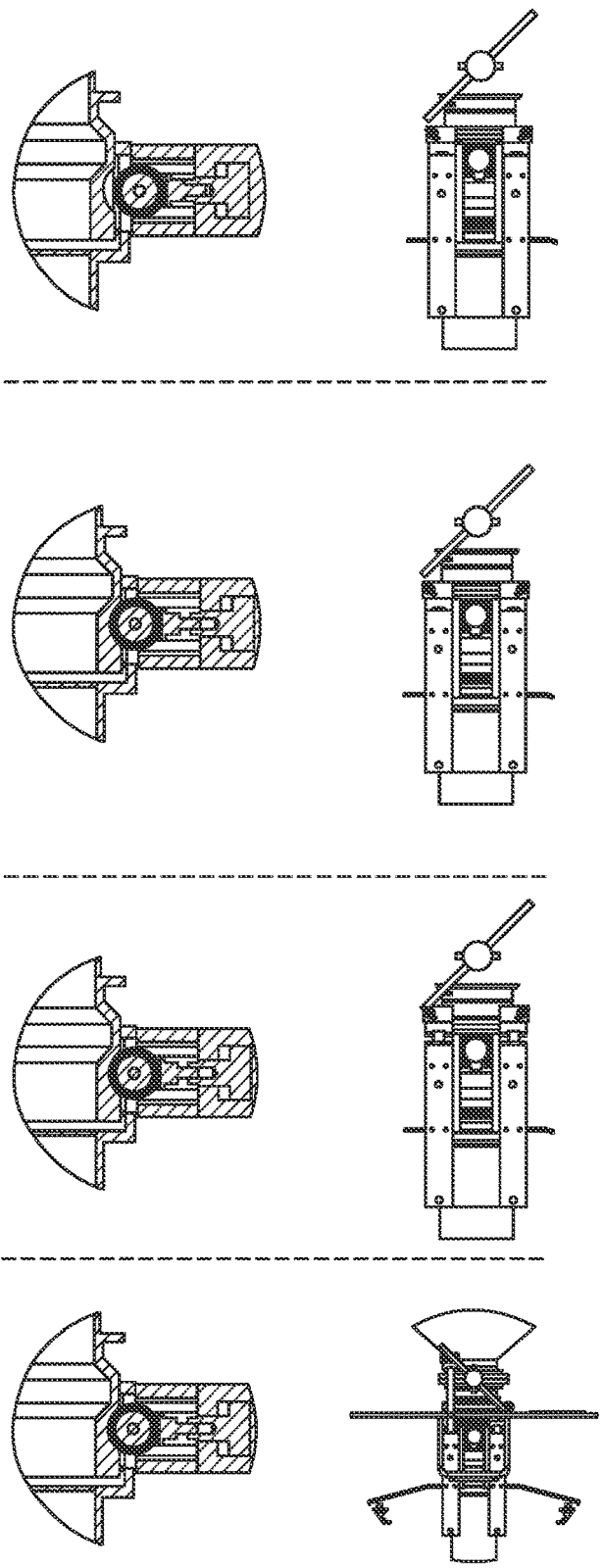
Figure 18B:
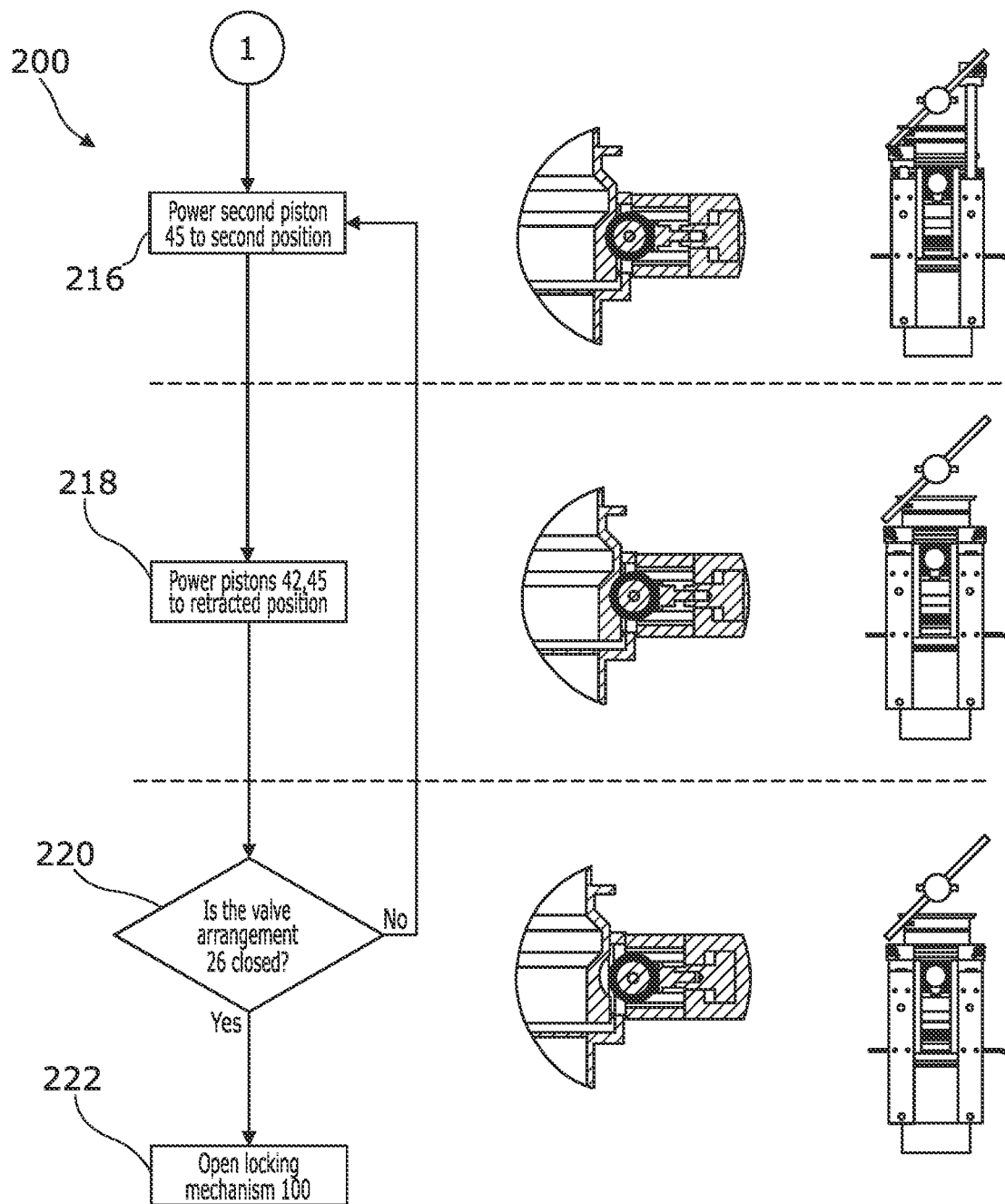
Figure 19:
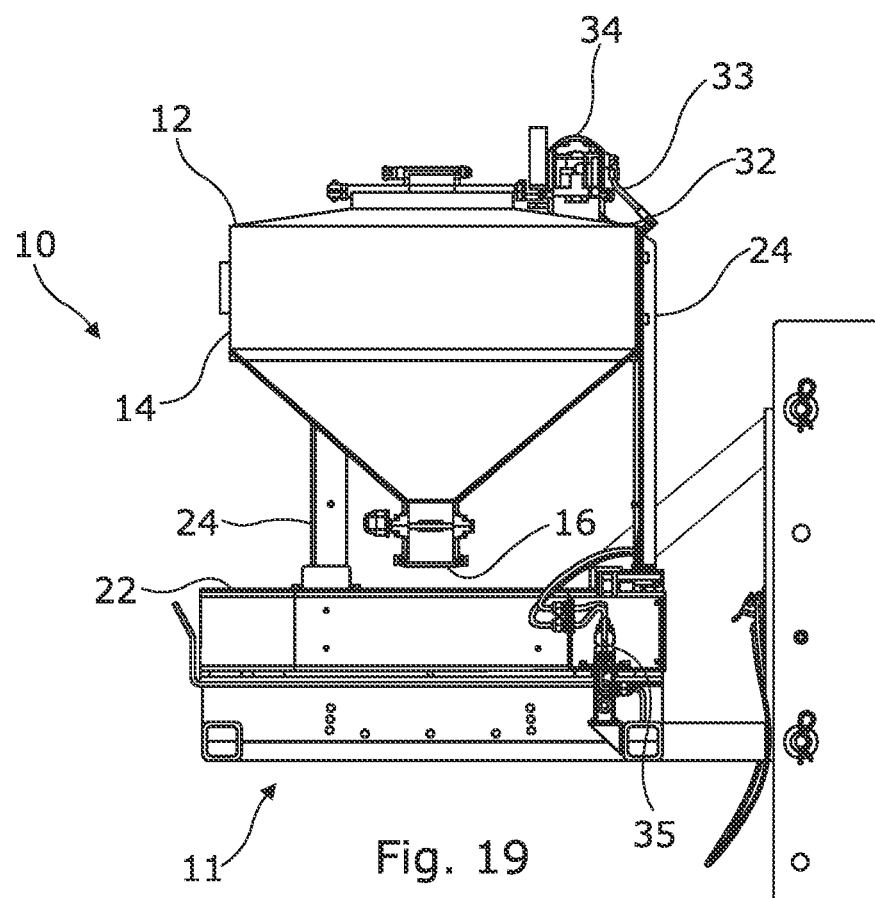
Figure 20:
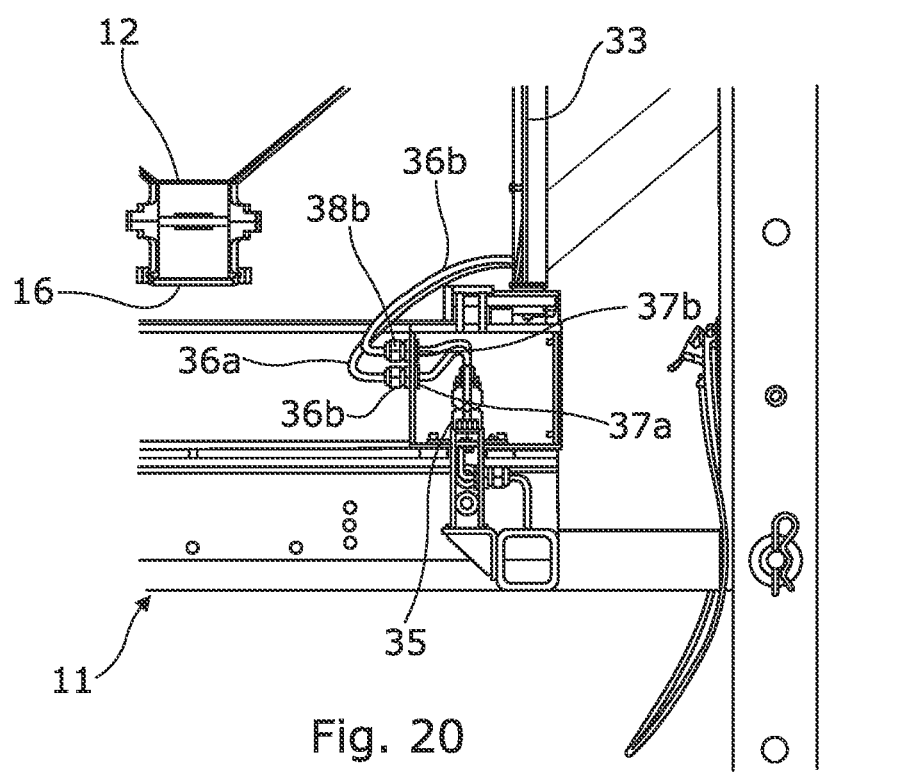

FIG. 15A corresponds to FIG. 14A with the locking mechanism in another state;

FIG. 15B is an enlargement of region F of FIG. 15A;

FIG. 16 is a perspective view of a further embodiment of a locking mechanism;

FIG. 17 is a cross-sectional view of the locking mechanism of FIG. 16;

FIG. 18A is a flowchart illustrating a control strategy for operating the docking arrangement described herein;

FIG. 18B is a continuation of the control strategy of FIG. 18A;

FIG. 19 is a side cross sectional view illustrating a further feature of the docking arrangement of the preceding Figures; and FIG. 20 is a further side cross sectional view of the docking arrangement.

The present invention relates to a docking arrangement 10 for a manufacturing process such as an additive manufacturing process.

Figure 1:
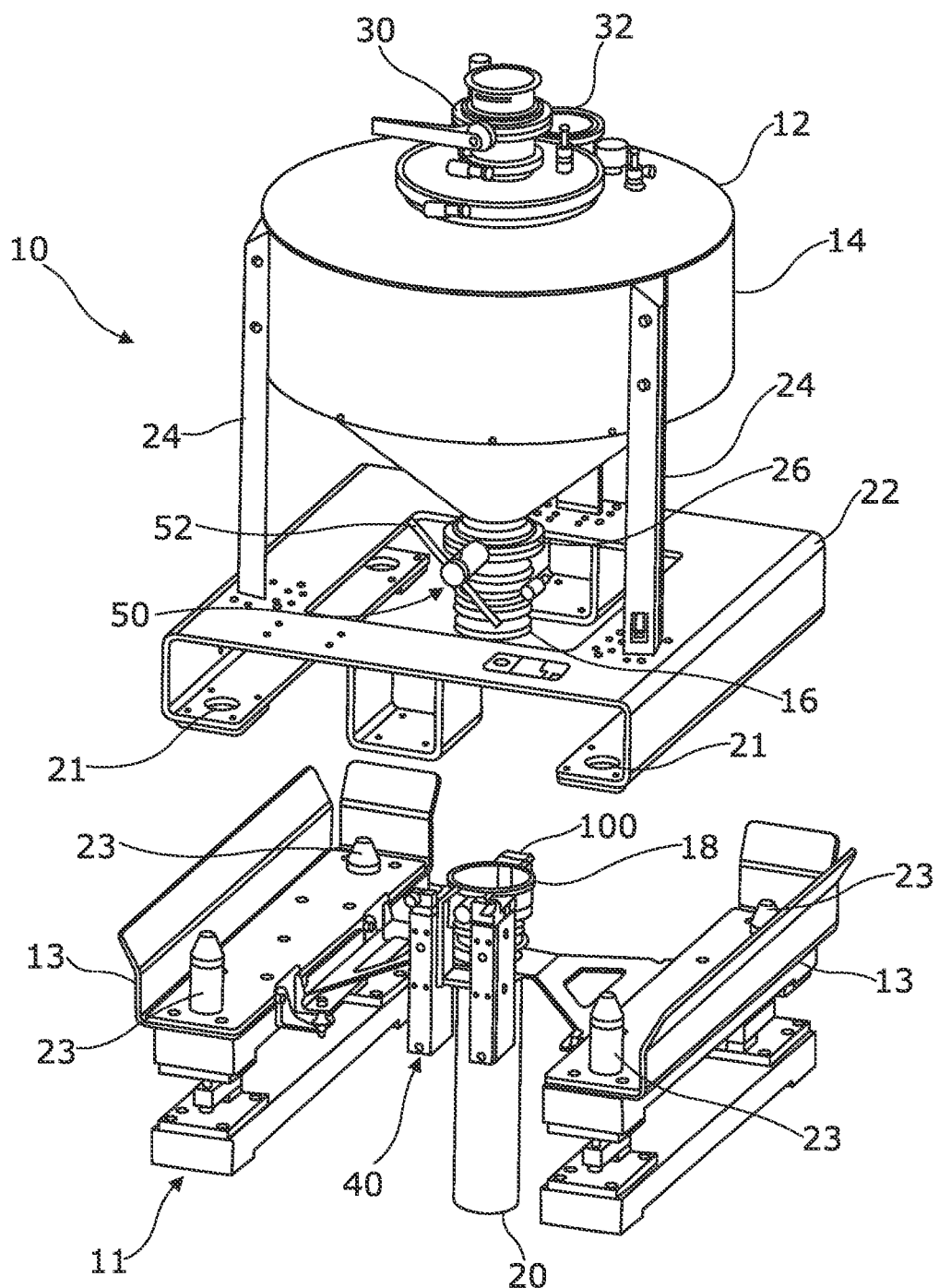
FIG. 1 is a perspective view of a docking arrangement.
Figure 2:
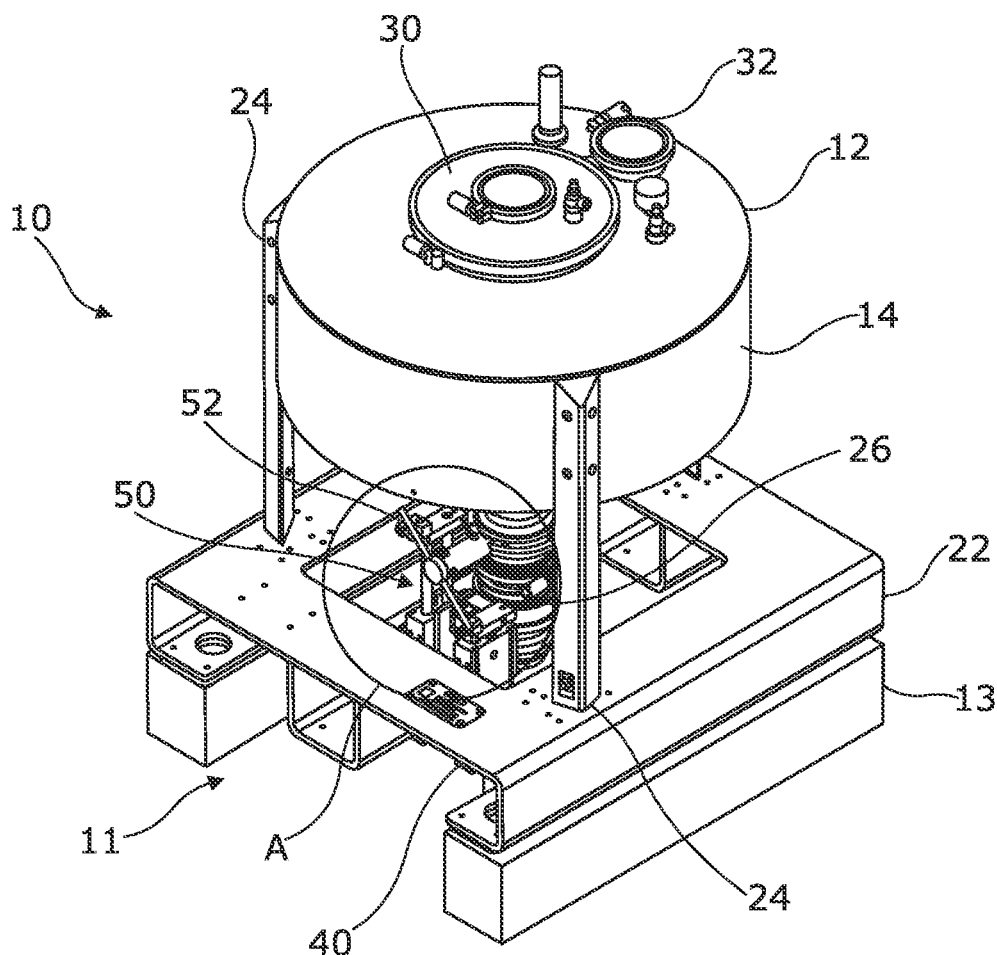
FIG. 2 is a perspective view of the docking arrangement of FIG. 1.
Figure 3:
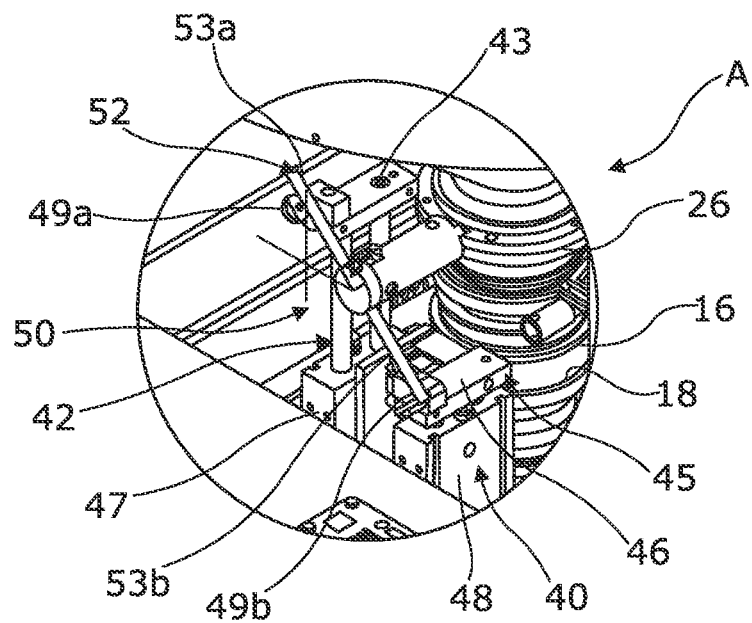
FIG. 3 is an enlarged view of region A of FIG. 2.
Figure 4:
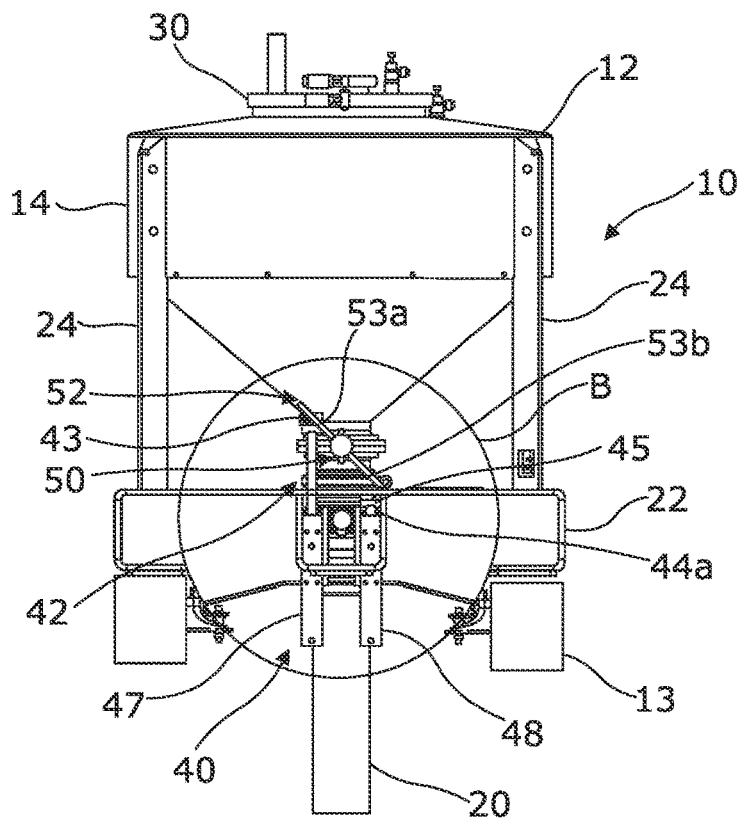
FIG. 4 is a side cross-sectional view of the docking arrangement shown in the preceding Figures.
Figure 5:
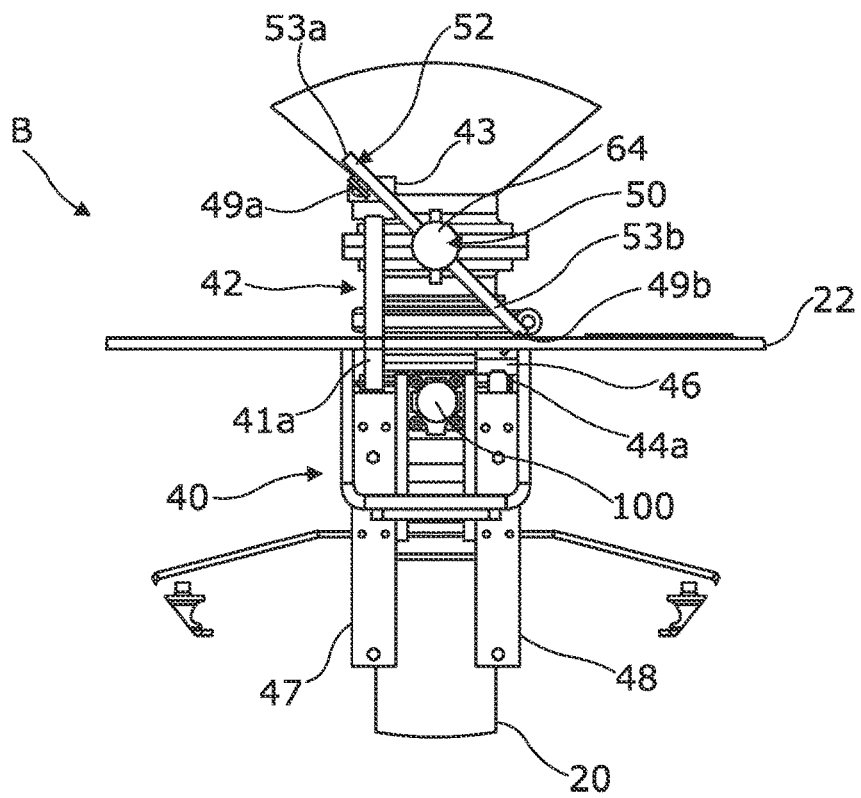
FIG. 5 is an enlarged view of section B of FIG. 4.

Referring to FIGS. 1 and 2, the docking arrangement 10 includes a dock 11 to which a container in the form of a hopper 12 may be coupled. These Figures show the hopper 12 undocked from and docked to the dock 11, respectively. In use, the dock 11 may correspond to a machine of an additive manufacturing process and the hopper 12 may contain powder (such as metal powder) to be supplied to that machine.

The hopper 12 includes a stand 22 and supporting arms 24 for supporting a container 14 of the hopper 12 on the stand 22. In the illustrated embodiment, three supporting arms 24 are provided. The container 14 may include powder for the additive manufacturing process. The container comprises an upper cylindrical portion above a frustroconical portion, leading to an outlet.

The hopper 12 includes an outlet 16 which may be coupled and secured to an inlet 18 on the dock 11. The coupling between the outlet 16 of the hopper 12 and the inlet 18 includes a locking mechanism 100. As is described in detail herein, the locking mechanism 100 comprises means to lock and secure the outlet 16 and inlet 18 to allow material from the container 14 of the hopper 12 to be supplied to a further component of the manufacturing process via the dock 11. In the illustrated embodiment, the inlet 18 is provided with a conduit 20 for supplying the material from the hopper 12 to the further component of the manufacturing process.

The stand 22 of the hopper 12 includes apertures 21 in a base thereof for receiving corresponding projecting members 23 on the dock 11. As shown, the projecting members 23 project upwardly from a surface 13 of the dock 11. The coupling of the apertures 21 with respective projecting members 23 may act to further secure the hopper 12 to the dock 11, in use.

The hopper 12 is provided with a valve arrangement 26 for controlling flow of material out of the container 14 of the hopper 12. In presently preferred embodiments the valve arrangement comprises an outlet valve in the form of a butterfly valve, however, it will be appreciated that the invention is not limited in this sense and the valve arrangement 26 can comprise any suitable valve type. In the illustrated embodiment, the outlet valve is controlled via an operating handle 50. As is described herein, operating handle 50 may be used to open and/or close the outlet valve of the valve arrangement 26 through rotation of a lever 52 of the operating handle 50, which may be effected in embodiments via an actuator 40 operatively coupled with the operating handle 50. In the illustrated embodiment, the actuator 40 forms part of the dock 11 and is positioned such that, upon docking of the hopper 12 on the dock 11, the operating handle 50 and actuator 40 are positioned relative to one another for subsequent actuation of the operating handle 50.

The hopper 12 is additionally provided with a gas inlet 32. As described with reference to FIGS. 19 and 20, in use, the gas inlet 32 may be used to control a pressure level inside the container 14 of the hopper 12. For example, it may be desirable to increase the pressure within the hopper 12 to aid flow of the material from the outlet 16.

As discussed herein, the docking arrangement 10 includes a dock 11 which may correspond (or form part of) to a machine of an additive manufacturing process (such as, for example, an additive manufacturing machine or a sieve) and the hopper 12 may contain powder to be supplied to that machine. However, in some instances it may be desirable for powder/material to be delivered to the hopper 12—e.g. to replenish the material therein. Accordingly, the hopper 12 is provided with an openable hatch 30 in an upper surface therein providing access to the interior of the container 14 of the hopper 12. In some instances, material from a further hopper may be deposited into the hopper 12. In such cases, the docking arrangement 10 may be used, where the inlet 18

(and optionally conduit 20) serve as an inlet to hopper 12 and a separate hopper is docked on the dock 11. This may be useful in embodiments where materials in two different hoppers may need to be blended, or simply for replenishing the material in hopper 12. In embodiments, material from one hopper or an additive manufacturing machine may be passed through a sieve before being deposited in the hopper 12. In such instances, the docking arrangement 10 may be adapted to receive a sieve.

FIGS. 3 to 7B illustrate an embodiment of the operating handle 50 and show how the actuator 40 may be used to actuate the operating handle 50 to open and/or close the outlet valve of the valve arrangement 26.

The operating handle 50 includes a lever 52 which may be rotated between a plurality of rotational positions and a rotatable shaft 56 connected to the lever 52. As is described herein, rotation of the lever 52 causes a corresponding rotation of the shaft 56 which in turn acts on the outlet valve (not shown) to control flow of the material out of the hopper 12.

The lever 52 is coupled to (e.g. suitably fixed to or integrally formed with) rotatable shaft 56 of the operating handle 50 approximately half way along its length via an end portion 64 such that the lever 52 is pivoted about its centre defining first and second lever arms 53a, 53b either side of the end portion 64. In use, the lever 52 (and hence the rotatable shaft 56) is rotatable between two rotational positions corresponding to a fully closed and fully open configuration of the associated valve arrangement 26.

In this embodiment, the actuator 40 takes the form of a dual piston arrangement which includes a first piston 42 and second piston 45. The first and second pistons 42, 45 are moveable between a plurality of positions in order to effect rotation of the lever 52. As shown and described herein, the first piston 42 is configured to act on the first lever arm 53a, and the second piston 45 is configured to act on the second lever arm 53b to rotate said lever arms 53a, 53b as required.

The first piston 42 includes a first pair of piston arms 41a, 41b and an upper supporting member 43 to which the piston arms 41a, 41b are coupled. A first roller 49a is mounted to the supporting member 43 and positioned so as to interact, in use, with the first lever arm 53a of the lever 52. The piston arms 41a, 41b are configured, in use, to move in and out of a first piston chamber 47, for example, through a hydraulic or pneumatic arrangement introducing or removing fluid from within the piston chamber 47. Alternatively, the actuator 40 may comprise an electrical actuator, such as a solenoid or motor configured to move arms 41a, 41b. In moving in and out of the first piston chamber 47, the piston arms 41a, 41b cause corresponding movement of the supporting member 43, and hence the roller 49a, to actuate movement (linear and/or rotational) of the lever 52 through interaction with the first lever arm 53a.

Similarly, the second piston 45 includes a second pair of piston arms 44a, 44b and an upper supporting member 46 to which the piston arms 44a, 44b are coupled. A second roller 49b is mounted to the supporting member 46 and positioned so as to interact, in use, with the second lever arm 53b of the lever 52. The piston arms 44a, 44b are configured, in use, to move in and out of a second piston chamber 48, for example, through a hydraulic or pneumatic arrangement introducing or removing fluid from within the piston chamber 48. Alternatively, and as described above, the actuator 40 may comprise an electrical actuator. In moving in and out of the second piston chamber 48, the piston arms 44a, 44b cause corresponding movement of the supporting member 46, and hence the roller 49b, to actuate movement (linear and/or rotational) of the lever 52 through interaction with the second lever arm 53b.

The pistons 42, 45 are configured to move linearly between a retracted position, a first position and a second position. In moving from a retracted position to a first position, the pistons 42, 45 may, depending on the rotational position of the lever 52, be brought into contact with respective lever arms 53a, 53b.

Specifically, with the lever 52 in its first rotational position, moving the first piston 42 from its retracted position to its first position brings the first roller 49a into contact with the first lever arm 53a. As discussed herein, bringing the first roller 49a into contact with the first lever arm 53a may cause linear movement of the first lever arm 53a. Subsequently moving the first piston 42 from its first position to its second position acts on the first lever arm 53a to rotate the lever 52 from its first rotational position to its second rotational position. As is described herein, this may act to open the valve arrangement 26.

Similarly, with the lever 52 in its second rotational position, moving the second piston 45 from its retracted position to its first position brings the second roller 49b into contact with the second lever arm 53b. As discussed herein, bringing the second roller 49b into contact with the second lever arm 53b may cause linear movement of the second lever arm 53b. Subsequently moving the second piston 45 from its first position to its second position acts on the second lever arm 53b to rotate the lever 52 from its second rotational position to its first rotational position. This may act to close the valve arrangement 26.

Figure 6:
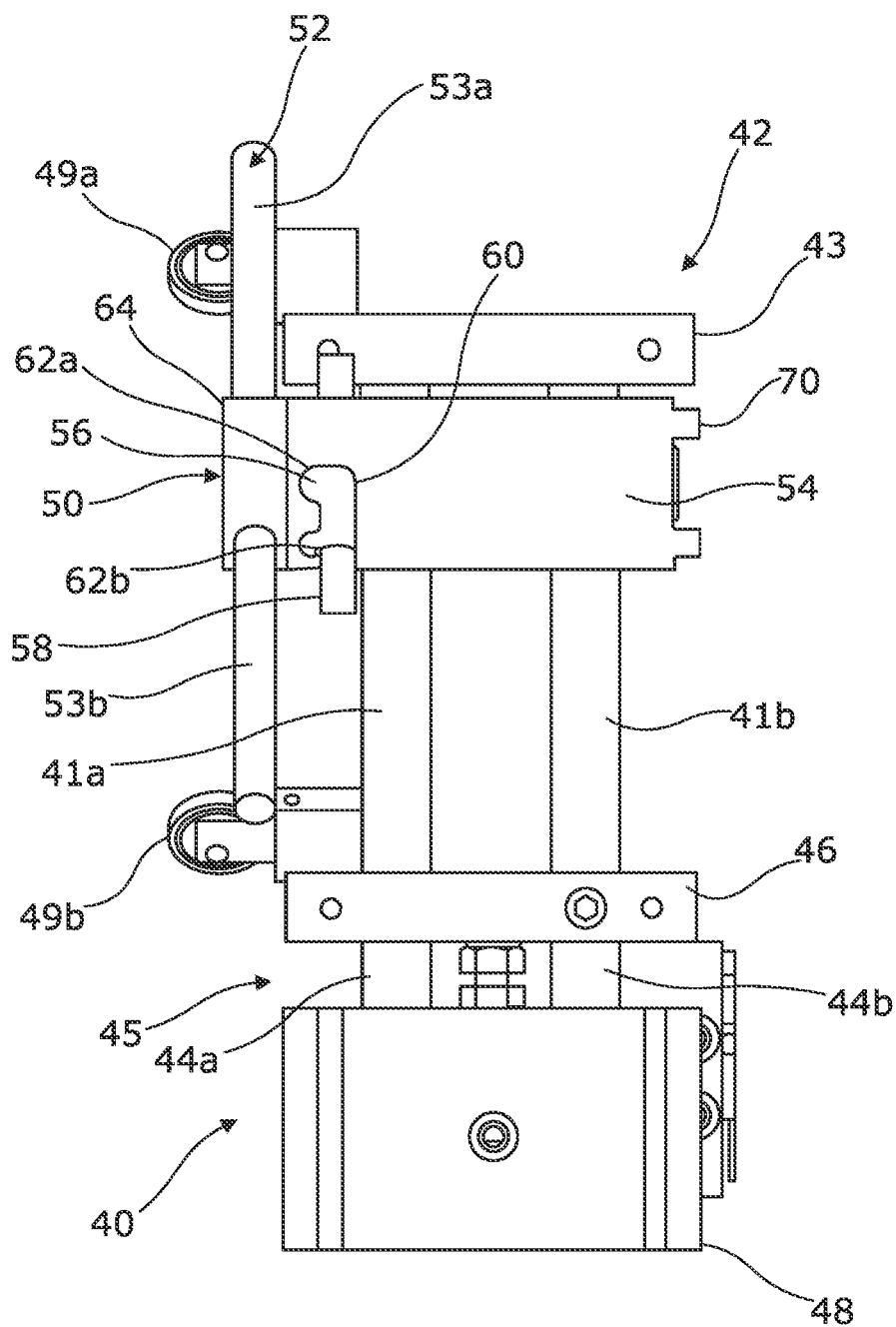
FIG. 6 is a side view of an embodiment of an operating handle.
Figure 8:
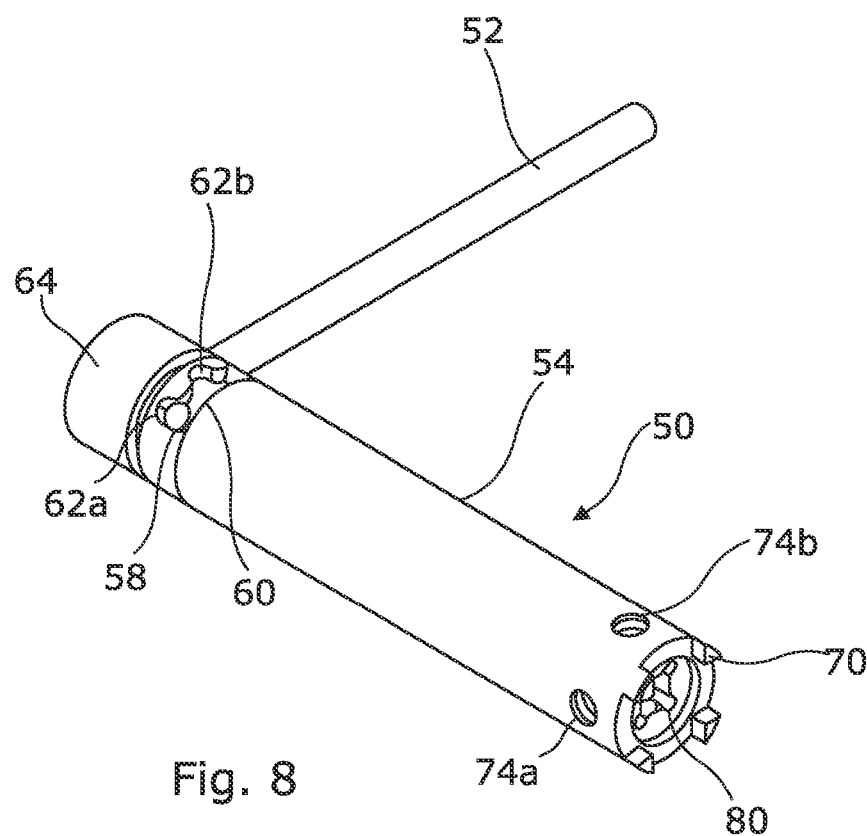
FIG. 8 is a perspective view of another embodiment of an operating handle.
Figure 9:
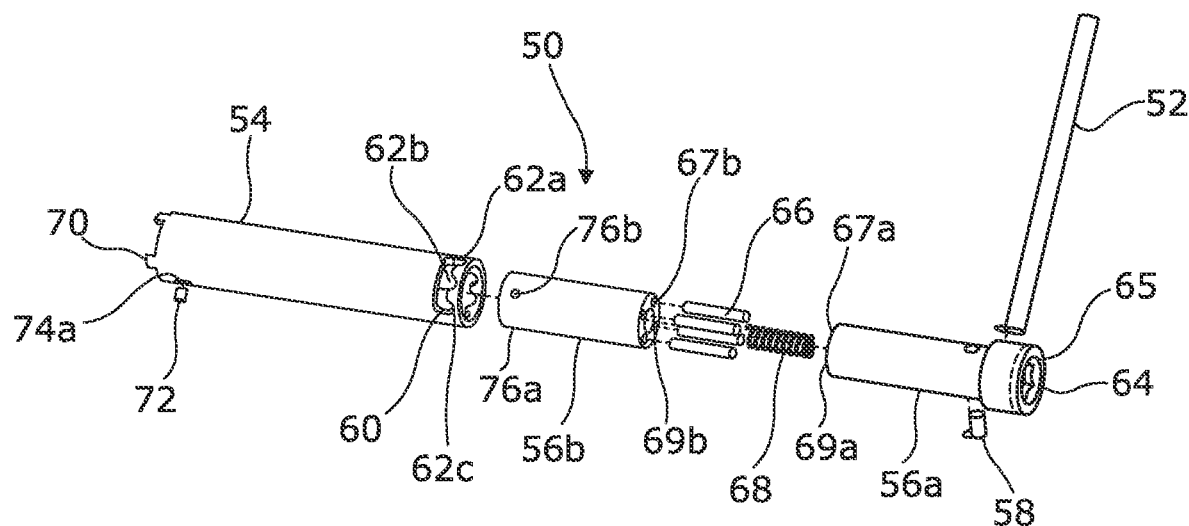
FIG. 9 is an exploded view of the operating handle shown in FIG. 8.

The first and second rollers 49a, 49b are configured to cause linear movement of the lever 52 from a first linear position to a second linear position when the first and/or second roller 49a, 49b is brought into contact with the respective lever arm 53a, 53b—i.e. upon movement of the respective piston 42, 45 from a retracted position to a first position. This linear movement of the lever 52 is necessary to disengage a rotation retention mechanism which otherwise prevents rotation of the lever 52. As is shown in FIG. 6 (and discussed in detail below with reference to FIGS. 8-11B), the operating handle 50 includes an outer sheath 54 within which the rotatable shaft 56 is received. The sheath 54 includes a slot 60 which is configured to receive a projecting portion 58 associated with the shaft 56. The slot 60 includes a series of notches 62a, 62b, 62c defining rotational positions of the lever 52 and hence shaft 56 of the operating handle 50. The projecting portion 58 is configured to move along the slot 60 in the outer sheath 54 upon rotation of the lever 52 and corresponding rotation of the shaft 56. With the lever 52 in its first linear position, the projecting portion 58 may be received within one of the notches 62a, 62b, 62c thereby preventing rotation of the shaft 56 under the operation of the lever 52. Accordingly, moving the lever 52 to its second linear position (e.g. by bringing the roller 49a or 49b into contact with respective lever arms 53a, 53b of the lever 52) is necessary to cause the projecting portion 58 to move out of contact with one of the notches 62a, 62b, 62c thereby allowing the shaft 56 to be rotated under movement of the lever 52.

The roller 49a and lever 52 are configured such that upon movement of the first piston 42 from its first position to its second position, and hence rotating the lever 52 from its first rotational position to its second rotational position, the first lever arm 53a moves out of contact with the roller 49a. This allows the lever 52 to move linearly from its second linear position to its first linear position (e.g. under the operation of a biasing member—see below) to re-engage the rotation retention mechanism to prevent further rotation of the lever 52. In this way, the lever 52 may be retained in its second rotational position following actuation by the first piston 42. Specifically, this is achieved by angling the roller 49a with respect to the lever 52 such that, with the first piston 42 in its first position and the lever in its first rotational position, the roller 49a is positioned perpendicular to the longitudinal axis of the first lever arm 53a. As the first piston 42 is moved to its second position, moving the lever 52 through an angle of 90° to its second rotational position, the roller 49a is moved to a position whereby it is positioned parallel longitudinal axis of the first lever arm 53a, thus moving the lever arm 53a out of contact with the roller 49a.

Roller 49b is configured in the same way. Specifically, roller 49b is configured such that upon movement of the second piston 45 from its first position to its second position, and hence rotating the lever 52 from its second rotational position to its first rotational position, the second lever arm 53b moves out of contact with the roller 49b. This allows the lever 52 to move linearly from its second linear position to its first linear position (e.g. under the operation of a biasing member—see below) to re-engage the rotation retention mechanism to prevent further rotation of the lever 52. In this way, the lever 52 may be retained in its first rotational position following actuation by the second piston 45. Specifically, this is achieved by angling the roller 49b with respect to the lever 52 such that, with the second piston 45 in its first position and the lever 52 in its second rotational position, the roller 49b is positioned perpendicular to the longitudinal axis of the second lever arm 53b. As the second piston 45 is moved to its second position, moving the lever 52 through an angle of 90° to its first rotational position, the roller 49b is moved to a position whereby it is positioned parallel longitudinal axis of the second lever arm 53b, thus moving the lever arm 53b out of contact with the roller 49b.

FIGS. 8-11B illustrate a variant of the operating handle 50 shown in the preceding Figures. Except where explicitly identified below, the operating handle 50 shown in FIGS. 8-11B is substantially identical in configuration to the operating handle 50 shown in the preceding Figures. Accordingly, unless otherwise stated, the following description further details the configuration of the operating handle 50 shown and described above.

As discussed herein, the operating handle 50 is configured, in use, to control operation of an outlet valve (not shown) of the valve arrangement 26 for controlling flow of a manufacturing material out of the outlet 16 of the hopper 12. The operating handle 50 includes a lever 52, a rotatable shaft 56 which includes first and second shaft portions 56a, 56b, and an outer sheath 54 in which the rotatable shaft 56 is located. The first shaft portion 56a is connected to the lever 52 such that rotation of the lever 52 causes a corresponding rotation of the shaft 56 which in turn acts on the outlet valve (not shown) to control flow of the material out of the hopper 12. In the illustrated arrangement, a bore 80 is provided in the end of the shaft 56 which acts as a female coupling for interaction with a corresponding male coupling on the valve arrangement 26. When coupled, the rotation of the shaft 56 acts to effect a corresponding rotation in the male coupling of the valve arrangement 26 for opening and closing the outlet valve.

The lever 52 comprises an end portion 64 and is coupled to the first shaft portion 56a (e.g. integrally formed with or suitably connected to) the first shaft portion 56a via the end portion 64. The end portion 64 itself is integrally formed with or suitably connected to the remainder of the lever 52, as will be appreciated.

At an end of the outer sheath 54, specifically the opposing end of the sheath 54 to the lever 52, the sheath 54 includes connection points 70 for connecting and securing the operating handle 50 to a valve arrangement 26 on the hopper 12 of the docking arrangement 10. Further, at this end of the sheath 54, apertures 74a, 74b are provided for receiving screws 72 for securing the second shaft portion 56b at the appropriate position within the sheath 54. The apertures may comprise a threaded surface for interacting with the screws 72. Corresponding (threaded) apertures 76a, 76b are provided at the end of the second shaft portion 56b.

First and second shaft portions 56a, 56b are operatively coupled via rods 66 which are configured to be located in corresponding slots 67a, 67b in first and second shaft portions 56a, 56b. The rods 66 provide an interface between the first and second shaft portions 56a, 56b ensuring that the second shaft portion 56b rotates with the first shaft portion 56a upon rotation of the lever 52 (e.g. through operation of an actuator).

The length of slots 67a, 67b is sufficiently large enough to allow a corresponding rod 66 to move within the slots 67a, 67b, e.g. such that the first shaft portion 56a may be moved axially with respect to the second shaft portion 56b between first and second axial positions along an axis running substantially centrally along the length of the shaft 56. In use, the first shaft portion 56a moves between first and second axial positions upon linear movement of the lever 52, which may be moved manually or under the operation of an actuator (e.g. actuator 40) as discussed herein.

Equally, the length of the slots 67a, 67b is sufficiently small such that at least a portion of a corresponding rod 66 is received within each opposing slot 67a, 67b with the first shaft portion 56a in either its first or second axial position such that the first shaft portion 56a and second shaft portion 56b remains operatively coupled at all times. This ensures that the first and second shaft portions 56a, 56b cannot rotate independently.

Figure 10A:
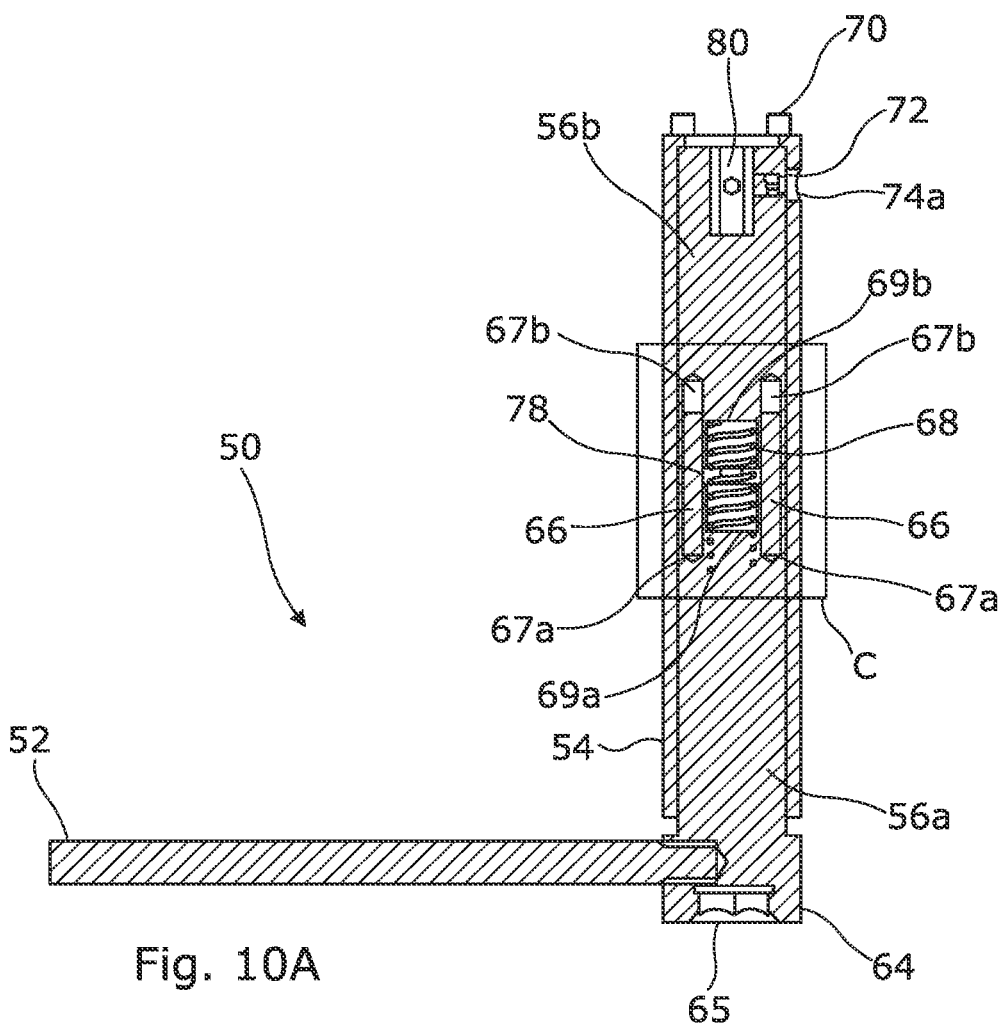
FIG. 10A is a cross-sectional view of the operating handle of FIGS. 8 and 9 in one state.
Figure 10B:
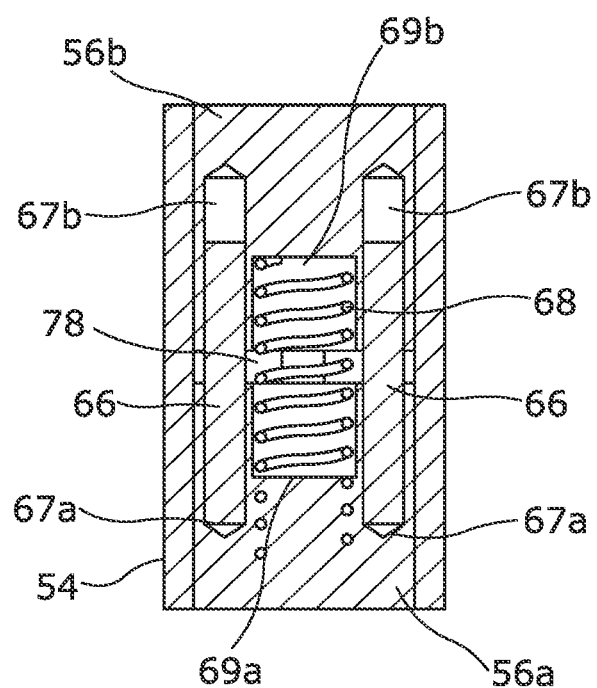
FIG. 10B is an enlargement of region C of FIG. 10A.
Figure 11A:
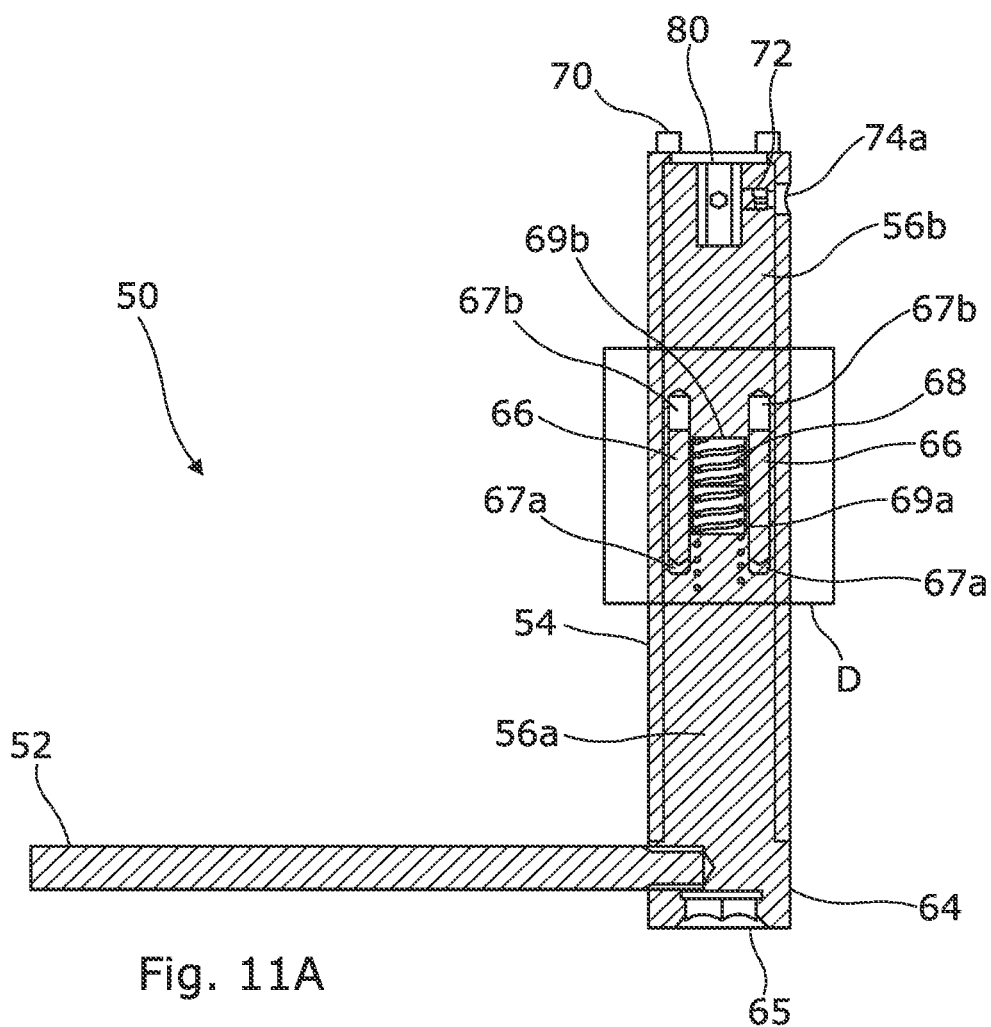
FIG. 11A is a cross-sectional view of the operating handle of FIGS. 8 and 9 in another state.
Figure 11B:
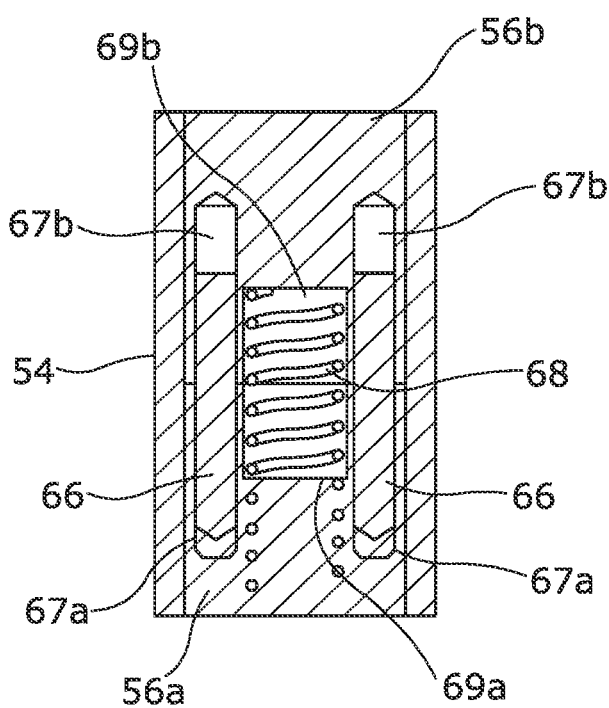
FIG. 11B is an enlargement of region D of FIG. 11A.
Figure 12:
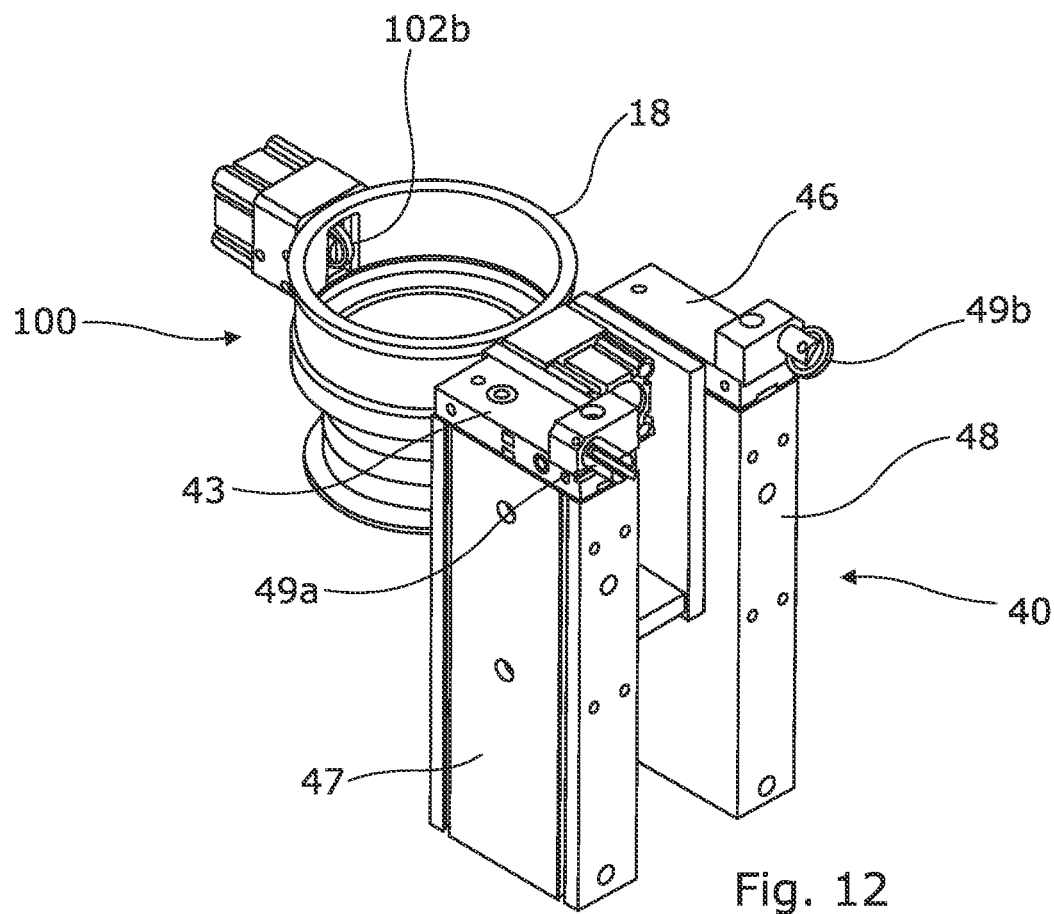
FIG. 12 is a perspective view of an embodiment of a locking mechanism.

In its first axial position, the first shaft portion 56a is separate from the second shaft portion 56b with a gap 78 therebetween (see FIGS. 10A & 10B). In its second axial position, the first shaft portion 56a is brought proximal to the second shaft portion 56b substantially eliminating any gap 78 therebetween (see FIGS. 11A & 11B).

First and second shaft portions 56a, 56b are additionally operatively coupled via a biasing member in the form of spring 68 located at either end in respective bores 69a, 69b in the first and second shaft portions 56a, 56b. The spring 68 is configured to provide a biasing force which acts with or against movement of the first shaft portion 56a between its first and second axial positions. In the illustrated embodiment, the biasing force provided by the spring 68 acts against movement of the first shaft portion 56a from its first axial position to its second axial position. Equally, the biasing force provided by the spring 69 acts with movement of the first shaft portion 56b from its second axial position to its first axial position. In this way, the biasing force acts to urge/retain the first shaft portion 56a to its first axial position unless acted on—e.g. via interaction of a user or an actuator with the lever 52 or other component of the operating handle 50.

Configuring the shaft 56 in this manner ensures that both first and second shaft portions 56a, 56b rotate together, but allows for the second shaft portion 56b to remain substantially stationary in an axial direction—for example, with respect to the outlet valve (not shown) such that it remains operatively coupled to the outlet valve at all times—and for the first shaft portion 56*a* to move relative to the second shaft portion 56*b* in an axial direction as may be required—for example, to engage/disengage a rotation retention mechanism as discussed herein.

As discussed briefly above, the operating handle 50 includes a rotation retention mechanism for retaining the lever 52 and hence shaft 56 in one of a plurality of rotational positions as may be required. Specifically, the outer sheath 54 includes a slot 60 which is configured to receive a projecting portion 58 associated with the first shaft portion 56*a*. The projecting portion 58 is configured to move along the slot 60 in the outer sheath 54 upon rotation of the lever 52 and corresponding rotation of the shaft 56. In the illustrated embodiment, the projecting portion 58 takes the form of a dowel suitably located and secured within an opening in the first shaft portion 56*a* and projecting from an exterior surface of the first shaft portion 56*a*.

The slot 60 includes a number of notches 62*a*, 62*b*, 62*c* for receiving the projecting portion 58. Notches 62*a*, 62*b*, 62*c* act to prevent rotation of the shaft 56 by retaining the projecting portion 58. In effect, the notches 62*a*, 62*b*, 62*c* define three angular positions in which the shaft 56 and lever 52 can be retained. Notch 62*a* corresponds to the first rotational position of the lever 52, notch 62*c* corresponds to the second rotational position of the lever 52, whilst notch 52*b* corresponds to an intermediate rotational position of the lever 52 between the first and second rotational positions. Accordingly, the notches 62*a*, 62*b*, 62*c* correspond to three operational states of the outlet valve (not shown), e.g. a fully closed, an intermediate and a fully open state for controlling flow of the manufacturing material.

The first shaft portion 56*a*, and hence the shaft 56 as a whole, is able to be rotated when the first shaft portion 56*a* is in its second axial position. Similarly, the first shaft portion, and hence the shaft 56, is unable to be rotated when the first shaft portion 56*b* is in its first axial position as a result of contact between the projecting portion 58 and one of the notches 62*a*, 62*b*, 62*c* in the slot 60. Providing the spring 68 ensures that unless the handle 50 is acted on (by a user or by an actuator) the first shaft portion 56*a* is held in its first axial position with the projecting portion 58 retained in contact with one of the notches 62*a*, 62*b*, 62*c* preventing rotation of the shaft 56. In order to rotate the shaft 56—i.e. to open/close the associated outlet valve—the first shaft portion 56*a* must be moved against the biasing force provided by the spring 68 to its second axial position (e.g. through linear movement of the lever 52), thereby disengaging the projecting portion 58 from the notch 62*a*, 62*b*, 62*c*. This in turn allows the projecting portion 58 to be moved along the slot 60—i.e. upon rotation of the shaft 56. After the shaft 56 is rotated to its desired angular position (corresponding to an associated operational state of the outlet valve) any external force applied to the first shaft portion 56*a*, e.g. by a user acting on the lever 52 or via an actuator, may be released, and the spring 68 acts to urge the first shaft portion 56*a* back to its first axial position with the projecting portion 58 engaged with a corresponding notch 62*a*, 62*b*, 62*c* in the slot 60 and the rotational position of the lever 52 and shaft 56 retained.

In the variant shown in FIGS. 8-11B, the lever 52 is pivoted about the operating handle 50 at an end thereof rather than at its centre as is the case with the operating handle 50 shown in the preceding Figures. Accordingly, the configuration of the actuator 40 may be unsuitable for use with this variant. Accordingly, in the variant shown in FIGS. 8-11B, the end portion 64 of the lever 52 includes a bore 65 which acts as a female coupling configured to receive a corresponding male coupling of an associated actuator (not shown). When coupled via the male/female coupling, the actuator may be configured to cause linear movement and/or rotation of the shaft 56—i.e. without a user manually acting on the lever 52. In this way, the arrangement provides an operating handle which may be controlled either manually or automatically without manual input as the situation may require. However, in this variant the actuator may have to be separately aligned with and coupled to the bore 65 following positioning of the hopper 12 with the dock 11. It may, however, be desirable to align the actuator with the operating handle upon docking of the hopper, as with the embodiment shown in FIGS. 1-7B.

In a further variant (not shown in the Figures), the operating handle may comprise a right angle drive type arrangement whereby a vertically oriented actuator (for example a vertical actuator drive shaft) may be received within a correspondingly oriented coupling on the operating handle upon docking of the hopper 12. In such an arrangement, the operating handle may include a gear arrangement, which could include a pair of bevel gears to effect corresponding rotation of a horizontally oriented drive shaft of the valve arrangement 26 under operation/rotation of the actuator.

In embodiments, the operating handle 50 may be specific to a type of material contained within the hopper 12. For instance, in the variant shown in FIGS. 8-11B, the bore 65 may include a configuration which is specific to the type of material contained within the hopper 12. Accordingly, a specifically configured actuator must be used to act on the operating handle 50 to open and close the associated outlet valve. The actuator may be associated with a certain component of the manufacturing process. In this way, the configuration of the operating handle 50 may be such that handle 50 may only be used (and material deposited from the hopper 50) for specific components within the manufacturing process. Accordingly, the operating handle 50 may be configured to prevent the wrong type of material being deposited at the wrong location or to the wrong component.

FIGS. 12-15B illustrate an embodiment of a locking mechanism 100 in accordance with the invention. The locking mechanism 100 is configured to couple and secure an outlet 16 of the hopper 12 to an inlet 18 of a further component of an additive manufacturing process, such as an additive manufacturing machine. Specifically, the locking arrangement 100 is provided with the inlet 18 and is positioned such that it may act on an external surface of the outlet 16 when the outlet 16 is received within an open upper end of the inlet 18.

Figure 13:
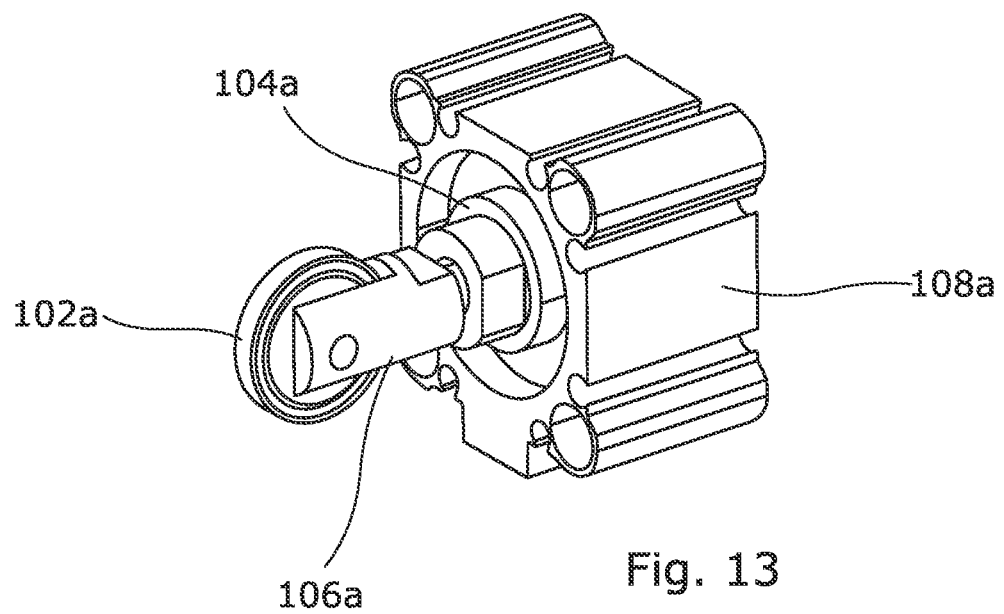
FIG. 13 is a perspective view of a component of the locking mechanism of FIG. 12.

The locking mechanism 100 includes a pair of opposing locking members in the form of rollers 102*a*, 102*b* which are moveable in a direction perpendicular to their rotation axis. In the orientation shown in the Figures, this comprises movement in a horizontal direction. Movement of the rollers 102*a*, 102*b* is controlled via respective linear actuators in the form of pistons 104*a*, 104*b*. The rollers 102*a*, 102*b* are mounted to respective pistons 104*a*, 104*b* via respective clevis-type fasteners 106*a*, 106*b* which allow rotational movement of the rollers 102*a*, 102*b* about respective rotation axes. This mounting arrangement is shown in FIG. 13. Alternatively the rollers may include an outer collar which is rotationally mounted, for example by way of needle roller bearings, to the remainder of the roller.

Figure 14B:
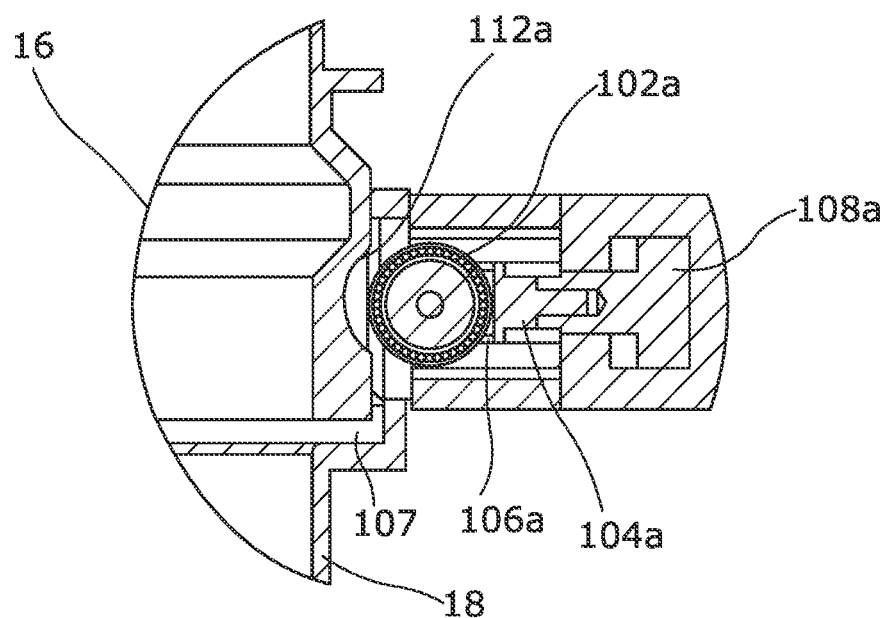
FIG. 14B is an enlargement of region E of FIG. 14A.

In use, the pistons 104*a*, 104*b* are configured to control movement of the respective rollers 102*a*, 102*b* between a first longitudinal position (as shown in FIGS. 14A and 14B) and a second longitudinal position (as shown in FIGS. 15A and 15B). In the illustrated embodiment, the first longitudinal position of the rollers 102a, 102b corresponds to an "unlocked" state of the locking mechanism 100 and the second longitudinal position corresponds to a "locked" state of the locking mechanism 100.

In alternative embodiments the rollers are mounted on an actuator other than a piston and cylinder device. The may be an electrical actuator, such as a solenoid.

The outlet 16 of the hopper 12 is provided with a groove 112 about an exterior surface thereof, depicted here by opposing groove sections 112a, 112b. The groove sections 112a, 112b correspond to respective rollers 102a, 102b. The groove 112 may be provided about the entire circumference of the outlet 16. In such embodiments, this may allow the hopper 12 to be secured within the docking arrangement 10 without requiring the hopper 12 to be positioned with the groove 112 precisely aligned with respective rollers 102a, 102b.

In use, the groove sections 112a, 112b are configured to receive at least part of respective rollers 102a, 102b to secure the outlet 16 of the hopper 12 to the inlet 18. Specifically, the process of coupling and securing the outlet 16 and inlet 18 begins with the rollers 102a, 102b provided in the first longitudinal position. With the rollers 102a, 102b in the first longitudinal position, the outlet 16 of the hopper 12 is able to be brought proximal and preferably into contact with the inlet 18. In the illustrated embodiment, the outlet 16 is positioned within a recess 107 within the open end of the inlet 18 as shown in FIGS. 14A and 14B. With the outlet 16 in this position, the rollers 102a, 102b are moved to the second longitudinal position (as shown in FIGS. 15A and 15B) under the operation of respective pistons 104a, 104b. When in the second longitudinal position the rollers 102a, 102b are at least partly received in the groove 112, specifically in corresponding groove sections 112a, 112b in the exterior wall of the outlet 16 preventing the outlet 16 from being withdrawn from the recess 107 in the inlet 18. In this way, the locking mechanism 100 may be used to couple and secure the outlet 16 to the inlet 18.

Pistons 104a, 104b are controlled pneumatically through the introduction and/or removal of gas from within respective piston chambers 108a, 108b. The gas is supplied and/or removed from piston chambers 108a, 108b via respective supply pipes 110a, 110b. As will be appreciated, introduction of gas into the piston chambers 108a, 108b will cause the pistons to move inwardly (in the configuration shown in the Figures) and hence cause the rollers 102a, 102b to move to the second longitudinal position. Removal of gas from within the piston chambers 108a, 108b will cause the pistons to move outwardly (in the configuration shown in the Figures) and hence cause the rollers 102a, 102b to move to the first longitudinal position.

Locking and unlocking of the locking mechanism 100 may preferably be controlled centrally via a control system (not shown). The central control system may also take into account other operational states of components of the docking arrangement 10 in controlling operation of the locking mechanism 100. For example, the central control system may require that the outlet valve of the valve arrangement 26 be in a closed state before allowing/controlling the locking mechanism 100 to unlock. Equally, the central control system may be configured to prevent opening of the outlet valve of the valve arrangement 26 unless the locking mechanism 100 is locked with the outlet 16 and inlet 18 coupled and secured in position.

An alternative locking mechanism 100' is shown in FIGS. 16 and 17.

The locking mechanism 100' includes a pair of locking members in the form of cams 102a', 102b', rotatably mounted at respective primary pivot points 109a', 109b'. In use, rotation of the cams 102a', 102b' about the respective primary pivot points 109a', 109b' causes the cams 102a', 102b' to move into and out of the interior of inlet 18 to between locked and unlocked positions to engage and disengage with the outlet 16 of the hopper 12 in a similar fashion to rollers 102a, 102b shown in the preceding Figures.

The cams 102a', 102b' are additionally rotatably mounted at ends thereof to respective linear actuators in the form of pistons 104a', 104b' via secondary pivot points 107a', 107b'. In use, movement of the cams 102a', 102b' is controlled via the pistons 104a', 104b' as described herein. Specifically, the pistons 104a', 104b' are configured to control movement of the respective cams 102a', 102b' between a first rotational position corresponding to an "unlocked" state of the locking mechanism 100' and a second rotational position corresponding to a "locked" state of the locking mechanism 100'. In the unlocked state, the cams 102a', 102b' are positioned substantially out of the interior of the inlet 18 (as shown in FIG. 17). In the locked state, the cams 102a', 102b' project into the interior of the inlet 18 to engage an exterior surface (e.g. a groove 112) of a corresponding outlet 16 of a hopper 12 as discussed above.

As will be appreciated, pistons 104a', 104b' may be controlled pneumatically through the introduction and/or removal of gas from within respective piston chambers 108a', 108'b. The gas is supplied and/or removed from piston chambers 108a', 108b' via respective supply pipes 110a', 110b'.

Introduction of gas into the piston chambers 108a', 108b' causes the pistons to move upwardly (in the configuration shown in the Figures) and hence cause the cams 102a', 102b' to rotate about respective primary pivot points 109a', 109b' from a first rotational position to a second rotational position. Conversely, removal of gas from within the piston chambers 108a', 108b' will cause the pistons 108a', 108b' to move downwardly (in the configuration shown in the Figures) and hence cause the cams 102a', 102b' to rotate about respective primary pivot points 109a', 109b' in the opposite sense from a second rotational position to a first rotational position.

In the illustrated embodiment, cams 102a', 102b' are "over-centre" cams. Rotation of the cams 102a', 102b' about respective primary pivot points 109a', 109b' past the horizontal—i.e. past where the primary pivot points 109a', 109b' are horizontally aligned with respective secondary pivot points 107a', 107b'—effectively locks the cams 102a', 102b' in place when in respective second rotational positions unless otherwise acted on by respective pistons 104a', 104b'. Specifically, this prevents any internal force/pressure on the cams 102a', 102b', e.g. by the outlet 16 of the hopper 12 from unintentionally "unlocking" the locking mechanism 100', in use.

As with locking mechanism 100, locking and unlocking of the locking mechanism 100' may preferably be controlled centrally via a control system (not shown). Again, the central control system may also take into account other operational states of components of the docking arrangement 10 in controlling operation of the locking mechanism 100'.

An example control strategy 200 of a central control system is shown in the flowchart of FIGS. 18A and 18B. Where applicable, FIGS. 18A and 18B include representations showing the operational state of the locking mechanism 100 and operating handle 50/actuator 40 arrangement at each step of the control strategy 200. FIG. 18A illustrates a first part of the control strategy 200 which includes securing the hopper 12 on the dock 11 and subsequently opening the valve arrangement 26 to allow material within the hopper 12 to be delivered to the associated further component of the manufacturing process.

Specifically, at 202, the locking mechanism 100 is provided in an open configuration. That is, the rollers 102a, 102b are retained in respective first longitudinal positions allowing an outlet 16 of the hopper 12 to be brought into position with respect to the inlet 18 of the dock 11 as described herein. At this step, the first and second pistons 42, 45 of the actuator 40 are retained in a retracted position with rollers 49a, 49b out of contact with respective lever arms 53a, 53b. The lever 52 is provided in its first rotational position, as shown, which corresponds to a closed configuration of the associated valve arrangement 26.

At 204, a check is performed to confirm that the outlet 16 of the hopper 12 is positioned within the inlet 18 of the dock 11. If not, the locking mechanism 100 remains in the open configuration.

Once the outlet 16 of the hopper 12 is in position within the inlet 18, the locking mechanism 100 may be closed at step 206. As discussed herein, closing the locking mechanism 100 includes powering pistons 104a, 104b to move respective rollers 102a, 102b to second longitudinal positions and specifically into contact with respective groove sections 112a, 112b within the exterior surface of the outlet 16. During this step, the first and second pistons 42, 45 are retained in respective retracted positions.

At steps 208 & 210 a pressure check is performed to confirm that a sealed connection has been formed between the outlet 16 and inlet 18. If not, the process returns to step 202 where the locking mechanism 100 may be opened to repeat the locking process of steps 202 to 206.

Once a sealed connection is confirmed, pistons 42, 45 are powered to respective first positions at step 212. Specifically, roller 49a associated with piston 42 is brought into contact with the first lever arm 53a of the lever 52 thereby depressing the lever 52 to disengage the rotation retention mechanism.

At step 214, piston 42 is powered to its second position thereby rotating the lever 52 and hence shaft 56 of the operating handle 50 through an angle of 90° to its second rotational position, as shown. The second rotational position of the lever 52 corresponds to an open configuration of the valve arrangement 26, thereby allowing material from the hopper 12 to exit through the outlet 16 into the further component of the manufacturing process via inlet 18.

Once a desired amount of material has been removed from the hopper 12, a reverse process may be performed to close the valve arrangement 26 and unlock the locking mechanism 100 thereby allowing the hopper 12 to be removed from the dock 11. This is shown in FIG. 18B.

At step 216, the second piston 45 is powered to its second position causing the roller 49b to act on the second lever arm 53b of the lever 52 thereby causing the lever 52 to rotate through an angle of 90° back to its first rotational position. In doing so, the valve arrangement 26 may be closed preventing any more material from leaving the hopper 12.

At step 218, both the first and second pistons 42, 45 are moved back to retracted positions whereby the rollers 49a, 49b are brought out of contact with respective lever arms 53a, 53b. In doing so, the lever 52 is free to move under the bias provided by spring 68 to engage the rotation retention mechanism to secure the lever 52 in its first rotational position (with the valve arrangement 26 closed).

At step 220, a check is performed to confirm that the valve arrangement 26 has been closed. If not, the process returns to step 216 to repeat the steps 216 and 218 to close the valve arrangement 26.

Once the valve arrangement 26 is confirmed to have been closed, the process continues to step 222 where the locking mechanism 100 may be opened. Specifically, pistons 104a, 104b are powered to move respective rollers 102a, 102b to first longitudinal positions and specifically out of contact with respective groove sections 112a, 112b within the exterior surface of the outlet 16. This releases the hopper 12 from the dock 11 allowing it to be removed.

FIGS. 19 and 20 illustrate a further feature of the docking arrangement 10. Specifically, these figures illustrate the operational use of the gas inlet 32. As shown, a gas supply unit 34 is coupled to the gas inlet 32 and is connected via a gas supply line 33 to a gas supply 35 associated with the dock 11. To effect this coupling, supply pipes 36a, 36b of the supply line are coupled via couplers 38a, 38b to respective couplers 37a, 37b on the dock 11.

The gas provided by the gas supply may in some instances comprise air, but may equally comprise a specific type of gas as required by the material contained within the hopper 12. As discussed herein, some materials may oxidise in air so must be kept under a controlled atmosphere. Accordingly, the gas supply 35 may comprise an inert gas (e.g. argon, nitrogen, etc.) which may suitably inhibit oxidation or other deterioration of the material within the hopper 12.

In a further use case, the gas supply 35 provides a source of gas to the hopper 12 for controlling a pressure level within the hopper 12 to assist in the flow of material from the outlet 16 of the hopper 12. The hopper 12 can additionally include a gas outlet (not shown) which may act as a bleed valve to ensure the pressure level inside the container 14 remains at a desired level, or below an acceptable maximum pressure level, for example. This enables gas to be bled from the hopper 12 enabling the gas supply 35 to be used to purge the hopper 12 of gas it contains, replacing it with gas from the gas supply 35.

The gas supply unit 34 can include one or more pressure sensors for monitoring the pressure within the hopper 12, and control the supply of gas to the hopper 12 based on the monitored pressure level. Operation of the gas supply unit 34 can be controlled by a control system (not shown).

In further embodiments, the gas supply 35 can be coupled to a gas inlet (not shown) at an interface between the outlet 16 of the hopper 12 and the inlet 18 on the dock 11. In such embodiments, the gas supply 35 can be used to purge the interface between the hopper 12 and the component of the manufacturing process to prevent deterioration of the material when it is being transferred to the component.

The one or more embodiments are described above by way of example only. Many variations are possible without departing from the scope of protection afforded by the appended claims.

The invention claimed is:

1. A docking arrangement for coupling an outlet of a container to an inlet for a component of an additive manufacturing process, the docking arrangement comprising:
    a dock configured to receive the container;
    a gas supply coupled to the dock; and
    a gas coupler configured, in use, to couple the gas supply with a gas inlet coupled to the container when the container is received within the dock.

2. A docking arrangement as claimed in claim 1, wherein the gas supply provides a source of gas to the container for controlling a pressure level within the container to assist in the flow of material from the container to the component of the additive manufacturing process.

3. A docking arrangement as claimed in claim 1, wherein the gas supply provides a source of gas to the container for controlling the atmosphere within the container and/or at an interface between the container and the component to prevent deterioration of the material held within the container.

4. A docking arrangement as claimed in claim 1, configured such that the gas coupler is automatically coupled with the gas inlet coupled to the container upon receiving the container within the dock.

5. A docking arrangement as claimed in claim 1, comprising a gas supply line which is connectable, in use, to the gas inlet coupled to the container after the container has been received within the dock.

6. A docking arrangement as claimed in claim 1, comprising one or more pressure sensors.

7. A docking arrangement as claimed in claim 6, wherein the one or more pressure sensors comprise an internal pressure sensor configured, in use, to determine a pressure level within the container.

8. A docking arrangement as claimed in claim 6, wherein the one or more pressure sensors comprise an external pressure sensor configured, in use, to determine a pressure level at an outlet of the container or external to the container.

9. A docking arrangement as claimed in claim 6 comprising a control system configured to control the supply of gas from the gas supply to the container in dependence on data received from the one or more pressure sensors.

10. A docking arrangement as claimed in claim 1, wherein the gas inlet is provided within an upper surface of the container.

11. A docking arrangement as claimed in claim 1, wherein the container comprises a gas outlet.

12. A docking arrangement as claimed in claim 1, wherein the gas supply comprises a gas which is selected based on the material held within the container.

13. A docking arrangement as claimed in claim 12, wherein the gas supply comprises an inert gas.

* * * * *